(12) United States Patent
Jwa et al.

(10) Patent No.: US 10,613,712 B2
(45) Date of Patent: Apr. 7, 2020

(54) ELECTRONIC DEVICE AND METHOD OF PROCESSING INFORMATION IN ELECTRONIC DEVICE

(71) Applicant: Samsung Electronics Co., Ltd., Gyeonggi-do (KR)

(72) Inventors: Chang-Hyup Jwa, Jeju-do (KR); Kyung-Tae Kim, Gyeonggi-do (KR); Hye-Rim Bae, Gyeonggi-do (KR); Yang-Wook Kim, Gyeonggi-do (KR); Sun-Kee Lee, Gyeonggi-do (KR); Doo-Suk Kang, Gyeonggi-do (KR); Chang-Ho Lee, Gyeonggi-do (KR); Sae-Mee Yim, Gyeonggi-do (KR); Yong-Joon Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 14/329,660

(22) Filed: Jul. 11, 2014

(65) Prior Publication Data
US 2015/0020027 A1 Jan. 15, 2015

(30) Foreign Application Priority Data

Jul. 12, 2013 (KR) .......................... 10-2013-0082506

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/04842* (2013.01); *G06F 16/9535* (2019.01); *G06F 16/9577* (2019.01)

(58) Field of Classification Search
CPC ...... G06F 3/0483; G06F 3/048; G06F 3/0482; G06F 3/04842; G06F 17/30867; G06F 17/30905; G06F 17/0483; G06N 5/04
(Continued)

(56) References Cited

U.S. PATENT DOCUMENTS 7,158,986 B1 * 1/2007 Oliver ............... G06F 17/30702
7,747,676 B1 * 6/2010 Nayfeh .................. G06Q 30/02
709/202

(Continued)

FOREIGN PATENT DOCUMENTS

KR 10-2010-0053503 5/2010
KR 10-2011-0133860 12/2011

OTHER PUBLICATIONS

Wohlstadter et. al, U.S. Appl. No. 61/782,656, filed Mar. 14, 2013, p. 1-11.*

(Continued)

*Primary Examiner* — Renee D Chavez
*Assistant Examiner* — Jianmei F Duckworth

(57) ABSTRACT

An apparatus for processing information of an electronic document includes: a display unit configured to display at least one recommended item indicating user interest information in a first electronic document, and a controller configured to provide to the display unit for displaying the at least one recommended item in the first electronic document based on user information collected from the first electronic document, and to provide to the display unit for displaying user interest information through a function corresponding to a selected item of the at least one recommended item.

13 Claims, 32 Drawing Sheets

(51) Int. Cl.
*G06F 16/9535* (2019.01)
*G06F 16/957* (2019.01)
*G06F 3/0482* (2013.01)
*G06F 3/0484* (2013.01)

(58) Field of Classification Search
USPC ........................................................ 715/811
See application file for complete search history.

(56) References Cited

U.S. PATENT DOCUMENTS

| | | | | |
|---|---|---|---|---|
| 2002/0198882 | A1* | 12/2002 | Linden | G06F 17/30867 |
| 2003/0074635 | A1* | 4/2003 | Cao | G06F 17/30867 |
| | | | | 715/205 |
| 2003/0105589 | A1* | 6/2003 | Liu | G06F 17/30017 |
| | | | | 702/1 |
| 2005/0132296 | A1* | 6/2005 | Milic-Frayling | |
| | | | | G06F 17/30873 |
| | | | | 715/745 |
| 2006/0005113 | A1* | 1/2006 | Baluja | G06F 17/218 |
| | | | | 715/207 |
| 2006/0075019 | A1* | 4/2006 | Donovan | G06Q 30/02 |
| | | | | 709/203 |
| 2007/0129977 | A1* | 6/2007 | Forney | G06F 17/30873 |
| | | | | 715/745 |
| 2008/0250026 | A1 | 9/2008 | Linden et al. | |
| 2009/0089293 | A1 | 4/2009 | Garritano et al. | |
| 2010/0185032 | A1 | 7/2010 | Iselborn et al. | |
| 2011/0082848 | A1 | 4/2011 | Goldentouch | |
| 2011/0276627 | A1* | 11/2011 | Blechar | G06F 21/41 |
| | | | | 709/203 |
| 2011/0296336 | A1* | 12/2011 | Law | G06F 3/0483 |
| | | | | 715/777 |
| 2013/0067114 | A1* | 3/2013 | Hjelm | G06Q 50/01 |
| | | | | 709/243 |
| 2013/0117675 | A1* | 5/2013 | Twig | G06F 17/30867 |
| | | | | 715/737 |
| 2013/0238783 | A1* | 9/2013 | Alexander | G06F 17/30873 |
| | | | | 709/224 |
| 2014/0279793 | A1* | 9/2014 | Wohlstadter | G06Q 30/0269 |
| | | | | 706/46 |

OTHER PUBLICATIONS

Extended European Search Report dated Dec. 11, 2014 in connection with European Patent Application No. 14176795.4; 9 pages.
Billsus, D., et al., "Improving Proactive Information Sysytems," ACM, New York, Jan. 9-12, 2005, pp. 159-166.
European Patent Office, "European Search Report," Application No. EP 19198627.2, dated Jan. 14, 2020, 7 pages.
Esposito, DOM, "Hands-On iOS 7 Control Center Demo—New Features," YouTube Video, Jun. 10, 2013, 2 pages.

\* cited by examiner

```
<input id="query" name="query" type="text" title="KEYWORD INPUT" class="날씨" tabindex="1"
accesskey="s" style="Ime-mode:active;" autocomplete="off"
onclick="document.getElementById('fbm').value=1;">
```
(a)

```
<div id="newscast_top">
 <ul class="cast_link">
  <li><a href="http://news.AAA.com/" onclick="clickcr(this, 'ncy.newshome', '', '', event)"
style="color:#339900"><strong>NAVER NEWS</strong></a></li>
  <li>|<a href="http://news.AAA.com/main/main.nhn?mode=LSD&mid=shm&sid1=106"
onclick="clickcr(this, 'ncy.entertainment', '', '', event)">ENTERTAINMENT</a></li>
  <li>|<a href="http://sports.news.AAA.com/sports/new/main/index.nhn"
onclick="clickcr(this, 'ncy.sports', '', '', event)" queryid="C1360154133922168476">SPORTS</a></li>
  <li>|<a href="http://news.AAA.com/main/main.nhn?mode=LSD&mid=shm&sid1=101"
onclick="clickcr(this, 'ncy.economy', '', '', event)">ECONOMIC</a></li>
  <li>|<a href="http://newsstand.AAA.com/" onclick="clickcr(this, 'ncy.special2', '', '', event)"
target="_blank"><strong>NEWS STAND</strong></a></li>
 </ul>
</div>
```
(b)

```
<ul class="menu">
 <li id="lnbTopMenu_0" >
  <a href="http://sports.news.AAA.com/sports/new/main/index.nhn" id="lnbTopMenuUrl_0"
onclick="clickcr(this, 'LNB.sportshome', 'sportshome', '', event);"><img src=
"http://imgnews.AAA.com/image/sports//2009/common/gnb/lnb/1245724194_file_image_0.gif"
id="lnbTopMenuImage_0" width="59" height="22" alt="SPORTS HOME"></a></li>
 <li id="lnbTopMenu_1">
  <a href="http://sports.news.AAA.com/sports/index.nhn?category=baseball" id="lnbTopMenuUrl_1"
onclick="clickcr(this, 'LNB.baseball', 'baseball', '', event);"><img src=
"http://imgnews.AAA.com/image/sports/2009/common/lnb/1242022929_file_thumbnail_0.gif"
id="lnbTopMenuImage_1" width="39" height="22" alt="BASEBALL"></a></li>
 <li id="lnbTopMenu_2">
  <a href="http://sports.news.AAA.com/sports/index.nhn?category=worldbaseball" id="lnbTopMenuUrl_2"
onclick="clickcr(this, 'LNB.worldbaseball', 'worldbaseball', '', event);"><img src=
"http://imgnews.AAA.com/image/sports/2009/common/lnb/1242200603_file_thumbnail_0.gif"
id="lnbTopMenuImage_2" width="58" height="22" alt="FOREIGN BASEBALL"></a></li>
 <li id="lnbTopMenu_3">
  <a href="http://sports.news.AAA.com/sports/index.nhn?category=soccer" id="lnbTopMenuUrl_3"
onclick="clickcr(this, 'LNB.soccer', 'soccer', '', event);"><img src=
"http://imgnews.AAA.com/image/sports/2009/common/lnb/1242201118_file_thumbnail_0.gif"
id="lnbTopMenuImage_3" width="40" height="22" alt="FOOTBALL"></a></li>
```
(c)

```
<div id="cast_articles" class="atc_cnts 2">
 <ul class="cast_atc">
  <li><a href="http://www.bloter.net/archives/142772" target="_blank">LG ELECTRONICS DEVELOPMENT</a>
<em class="ctg"><a href="http://www.bloter.net/" target="_blank">BLOTER.NET</a></em></li>
  <li><a href="http://news.kbs.co.kr/news/NewsView.do?SEARCH_NEWS_CODE=2609050"
target="_blank">WHERE IS IT SOLD?</a><em class="ctg"><a href="http://www.kbs.co.kr/"
target="_blank">KBS TV</a></em><img src="http://static.AAA.net/w9/blank.gif"
alt="VIDEO" class="atc_play" width="11" height="12"></li>
  <li><a href="http://news.hankyung.com/201302/2013020653227.html?ch=news"
target="_blank">INTERNET SPEED IN WORLD</a><em class="ctg">
<a href="http://www.hankyung.com/" target="_blank">KOREAN ECONOMIC</a></em></li>
  <li><a href="http://nbiz.heraldcorp.com/view.php?ud=20130206000521" target="_blank">
CALORIC BOMB</a><em class="ctg"><a href="http://www.heraldbiz.com/" target="_blank">
HERALD ECONOMIC</a></em></li>
 </ul>
</div>
```
(d)

| | Action ID | Action | Tag | ID or ParentID | Name | Title or alt | class or Parent's | href | value or innerText | prev URL | current URL |
|---|---|---|---|---|---|---|---|---|---|---|---|
| a | 1 | Text INPUT | input | query | query | KEYWORD INPUT | | | | | AAA.com |
| b | 2 | Link open | a-li | newscast_top | | | cast_link | sport.AAA | "WEATHER" | | AAA.com |
| b | | sibling-2 | a-li | newscast_top | | | cast_link | | SPORTS | | AAA.com |
| b | | sibling-2 | a-li | newscast_top | | | cast_link | | ENTERTAINMENT | | AAA.com |
| b | | sibling-2 | a-li | newscast_top | | | cast_link | | ECONOMIC | | AAA.com |
| b | | sibling-2 | a-li | newscast_top | | | cast_link | | NEWS STAND | | AAA.com |
| b | | sibling-2 | a-li | newscast_top | | | cast_link | | NAVER NEWS | | AAA.com |
| c | 3 | Link open | a-li | lnbTopMenulmage_1 | | BASEBALL | | baseball.AAA | | AAA.com | sports.AAA |
| c | | sibling-3 | a-li | lnbTopMenulmage_2 | | SPORTS HOME | | sport.AAA | | | sports.AAA |
| c | | sibling-3 | a-li | lnbTopMenulmage_3 | | FOREIGN BASEBALL | | baseball2.AAA | | AAA.com | sports.AAA |
| c | | sibling-3 | a-li | lnbTopMenulmage_4 | | FOOTBALL | | soccer.AAA | | AAA.com | sports.AAA |
| d | 4 | Link open | a-li | cast_articles | | | cast_atc | zdnet.co.kr | LG ELECTRONICS DEVELOPMENT | | AAA.com |
| d | | sibling-4 | a-li | cast_articles | | | cast_atc | dt.co.kr | WHERE IS IT SOLD? | | AAA.com |
| d | | sibling-4 | a-li | cast_articles | | | cast_atc | etnews.com | INTERNET SPEED IN WORLD | | AAA.com |
| d | | sibling-4 | a-li | cast_articles | | | cast_atc | koreatimes | CALORIC BOMB | | AAA.com |

```
<input type="text" value="" title="INPUTTING KEYWORD" size="55" tabindex="1" name="q" id="q" autocomplete="off" style="">
```

(a)

```
<a href="http://sports.media.BBB.net/" class="ir #sports"><span class="ir_desc">SPORTS</span></a>
```

(b)

```
<a href="http://sports.media.BBB.net/baseball/">BASEBALL</a>
```

ELECTRONIC DEVICE AND METHOD OF PROCESSING INFORMATION IN ELECTRONIC DEVICE

CROSS-REFERENCE TO RELATED APPLICATION(S) AND CLAIM OF PRIORITY

The present application is related to and claims the priority under 35 U.S.C. § 119(a) to Korean Application Serial No. 10-2013-0082506, which was filed in the Korean Intellectual Property Office on Jul. 12, 2013, the entire content of which is hereby incorporated by reference.

TECHNICAL FIELD

The present application relates to an electronic device and a method of processing information therein, and more particularly to an electronic device and a method of processing information which have rapid access to information of interest to a user in an electronic document.

BACKGROUND

A user conveniently searches for and displays electronic documents via a web browser in his/her portable device. However, in a case where a large amount of information is present in the electronic document, it is difficult to display the large amount of information on a small screen of the user's portable device. Accordingly, a user is inconvenienced in seeking desired information bit by bit through a specific operation.

SUMMARY

To address the above-discussed deficiencies of the related art, it is a primary object to provide an electronic device and a method of processing information therein, which have rapid access to information of interest to a user in an electronic document.

Further, certain embodiments provide an electronic device and a method of processing information therein, which predict and have access to information of interest to a user by a small number of operations.

Further, certain embodiments provide an electronic device and a method of processing information therein, which predict and provide information of interest to a user by a small number of operations.

In accordance with certain embodiments, an electronic device is provided. The electronic device includes: a display unit configured to display at least one recommended item indicating user interest information in a first electronic document, and a controller configured to provide to the display unit for displaying the at least one recommended item in the first electronic document based on user information collected from the first electronic document, and to provide to the display unit for displaying user interest information through a function corresponding to a selected item of the at least one recommended item.

In accordance with certain embodiments, a method of processing information of an electronic device is provided. The method includes: displaying at least one recommended item indicating user interest information in a first electronic document, based on user information collected from the first electronic document; and displaying the user interest information through a function corresponding to an item selected from the at least one recommended item.

In the electronic device and the method of processing information therein, it is possible to have rapid access to the user interest information in the electronic document. Also, it is possible to predict and recommend interest information or an interest operation of the user, thereby securing identical usability with a small number of operations in comparison with another electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B illustrate a collection of user information in the electronic device according to certain embodiments;

FIG. 4 illustrates a collection of user information in the electronic device according to certain embodiments;

FIGS. 10A, 10B and 10C illustrate an operation of displaying recommended items in the electronic document of the electronic device according to certain embodiments, based on user interest information of another electronic document;

DETAILED DESCRIPTION

Figure 1:
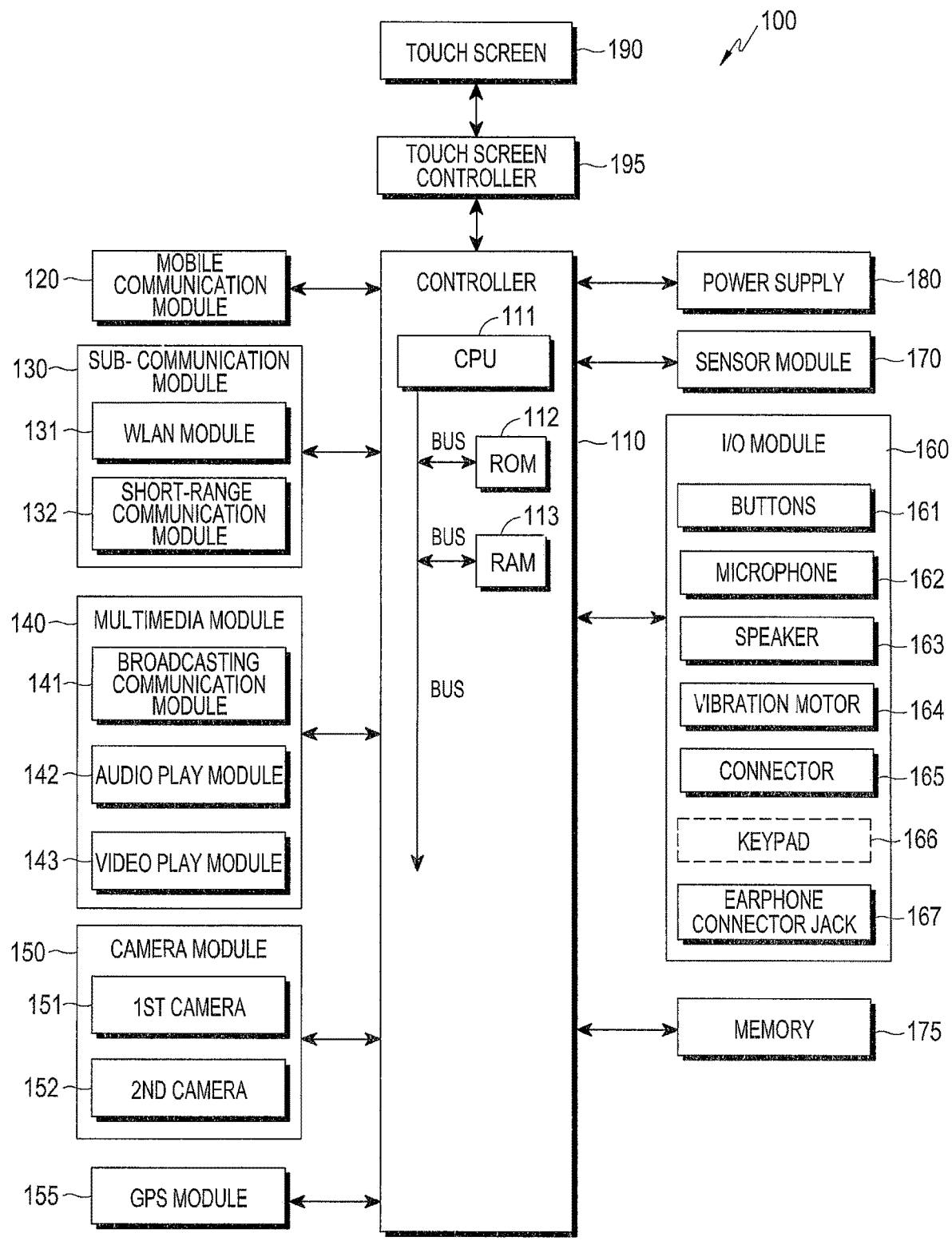
FIG. 1 illustrates an electronic device according to certain embodiments.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, various embodiments will be described in detail with reference to the accompanying drawings. However, the present application is not restricted or limited by the exemplary embodiments. The same reference numerals represented in each of the drawings indicate the elements that perform substantially the same functions. While terms including ordinal numbers, such as "first" and "second," etc., may be used to describe various components, such components are not limited by the above terms.

The terms are used merely for the purpose to distinguish an element from the other elements. For example, a first element could be termed a second element, and similarly, a second element could be also termed a first element without departing from the scope of the present application. The terms used herein are merely used to describe specific embodiments, and are not intended to limit the present application. As used herein, the singular forms are intended to include the plural forms as well, unless the context clearly indicates otherwise.

An electronic device according to the various embodiments can include a user device, and the user device includes a user portable device and a user fixed device.

Here, the portable terminal corresponds to an easily carried and movable electronic device, which can be a video phone, a mobile phone, a smart phone, a WCDMA terminal, a Universal Mobile Telecommunication Service (UMTS) terminal, a Personal Digital Assistant (PDA), a Portable Multimedia Player (PMP), a Digital Multimedia Broadcasting (DMB) terminal, an e-book, a portable computer (notebook, tablet PC or the like), a digital camera or the like. Further, a fixed user device can be, for example, a desktop personal computer, etc.

The user fixed device can be, for example, a personal desktop computer.

It is described that an electronic document according to the various embodiments is displayed on a touch screen unit of the electronic device. However, the electronic document can be displayed on an external separate display device controlled by the electronic device.

The electronic document according to the various embodiments can include all applications including a web browser engine, e-mail, an e-book function, and a web application as well as a web page of a web browser, and all general applications which can be analyzed.

The electronic document according to the various embodiments includes a plurality of objects which include an image or text to be selected and a search window in which text is input.

FIG. 1 is a schematic operation diagram illustrating an electronic device according to embodiments.

Referring to FIG. 1, the electronic device 100 is connected to an external device (not shown) by using an external device connection unit such as a sub-communication module 130, a connector 165, and an earphone connecting jack 167. The "external device" can include various devices such as an earphone which is detachably connected to the electronic device 100 by a wire, an external speaker, a Universal Serial Bus (USB) memory, a charger, a cradle/dock, a DMB antenna, a mobile payment unit, a health-care device such as a blood-sugar meter and the like, a game player, a navigation unit for a vehicle, and the like. Further, the "external device" can include a short-range communication unit such as a Bluetooth communication unit, a Near Field Communication (NFC) unit, and the like, a Wi-Fi direct communication device, and a wireless Access Point (AP), which are wirelessly connected to the electronic device 100 via short-range communication. Furthermore, the external device includes other devices, a portable phone, a smartphone, a tablet PC, a desktop PC and a server.

Referring to FIG. 1, the electronic device 100 includes a display unit 190 and a display controller 195. Further, the electronic device 100 includes a controller 110, a mobile communication module 120, a sub-communication module 130, a multimedia module 140, a camera module 150, a GPS module 155, an input/output module 160, a sensor module 170, a storage unit 175 and an electric power supply unit

180. The sub-communication module 130 includes at least one of a wireless LAN module 131 and a short-range communication module 132, and the multimedia module 140 includes at least one of a broadcasting and communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, a connector 165 and a keypad 166. Hereinafter, the display unit 190 and the display controller 195 which correspond to a touch screen and a touch screen controller respectively will be described as an example.

The controller 110 can include a CPU 111, a ROM 112 in which a control program for a control of the electronic device 100 is stored, and a RAM 113 which stores signals or data input from outside of the electronic device 100, or is used as a storage region for operations performed by the electronic device 100. The CPU 111 can include a single core CPU, a dual core CPU, a triple core CPU, or a quad core CPU. The CPU 111, the ROM 112 and the RAM 113 are connected to one another through an internal bus.

The controller 110 is capable of controlling the mobile communication module 120, the sub-communication module 130, the multimedia module 140, the camera module 150, the UPS module 155, the input/output module 160, the sensor module 170, the storage unit 175, the electric power supply unit 180, the touch screen 190 and the touch screen controller 195.

Moreover, according to the various embodiments, the controller 110 can collect information on a selected object as user information of an electronic document, when the object is selected from an electronic document including a plurality of objects. The information on the object can be detected through a language, i.e. HTML, to constitute pages of the electronic document. In addition, the controller 110 stores the collected user information in the storage unit 175. For example, the controller 110 makes and stores a user information table of the electronic device in the storage unit 175, based on the collected user information.

When the electronic document is displayed through an input of a URL, the controller 110 controls at least one recommended items to be displayed, so that user interest information is shown based on a user information table of the electronic document.

When at least one specific item of the recommended items is selected, the controller 110 controls the user interest information to be displayed through a function corresponding to the selected and recommended item.

The at least one recommended item includes movement to a previous page, movement to a recommendatory page, a recommended action, i.e. click, zoom, text input, link open, scroll, and the like, movement to a recommended page from the recommendatory page and an action to be recommended in the recommendatory page.

According to the various embodiments, the controller 110 controls the recommended item to be variably changed and displayed, based on a user information table of the electronic document.

Furthermore, in a case where another electronic document is displayed through a URL input according to certain embodiments, the controller 110 detects user information stored in structural elements of a user information table of the electronic document among several pieces of information on each of plural objects included in the other electronic documents, if plural pieces of user information collected from the other electronic documents, for example a user information table of the other electronic documents, are not present. The controller 110 controls the at least one recommended items to be displayed in the other electronic documents, based on the user information detected from the user information table of the electronic document.

Further, the controller 110 controls the at least one recommended item to be displayed as a menu used for movement from a page to an interest region in the electronic document, according to certain embodiments.

Further, the controller 110 controls the at least one recommended item to be displayed as a menu used for movement to an interest page in the electronic document, or to an interest page in the other electronic documents, according to certain embodiments.

Further, according to certain embodiments, when the electronic document is loaded and displayed in a display region on the display unit, the controller 110 detects an interest region from a page of the electronic document, based on the user information of the electronic document stored in the storage unit 175, and controls the interest region to be directly displayed in the display region if the detected and interest region is not displayed in the display region of the display unit. Further, the controller 110 provides the at least one recommended items in various forms, for example, in a tree form shown in FIG. 13 or in a paging form shown in FIG. 15C, so that a size or number of recommended items is changed by a user. The controller 110 determines whether the at least one recommended items are displayed via a specific gesture or a setting of an environmental setting menu.

Further, when a specific item of the recommended items displayed on the electronic document is selected according to certain embodiments, the controller unit 110 controls whether remaining recommended items are displayed, or whether the specific item of the recommended items is displayed.

Further, the controller 110 controls at least one recommended item displayed in the electronic document to be selected by voice or an input on a virtual keypad displayed on the touch screen 190. For example, in a case that at least one recommended item is matched with numbers, respectively, the controller 110 selects a recommended item corresponding to the received number when voice data providing a number is received through a microphone 162. Further, when a number is input through an input unit of the touch screen 190, the controller 110 selects a recommended item corresponding to the input number.

Furthermore, according to certain embodiments, the controller 110 changes and displays the at least one recommended items as an object is varied in real time in the electronic document. The controller 110 controls a new interest object to be additionally displayed as a recommended item when the new interest object is detected from the electronic document.

The mobile communication module 120 connects the external device to the electronic device 100 by using one or more antennas (not shown) under a control of the controller 110. The mobile communication module 120 can transmit and receive radio signals for a voice call, a video call, a Short Message Service (SMS), a Multimedia Message Service (MMS), or other data to/from a portable phone (not shown), a smart phone (not shown), a tablet PC, or other devices (not shown) which communicate with the electronic device 100.

The sub-communication module 130 can include at least one of the wireless LAN module 131 and the short-range communication module 132. For example, the sub-communication module 130 can include only the wireless LAN module 131, only the short-range communication module 132, or both the wireless LAN module 131 and the short-range communication module 132.

The wireless LAN module 131 is connected to a communication network, i.e. a LAN and the Internet, at a location in which the wireless Access Point (AP, not shown) is installed, under a control of the controller 110. The wireless LAN module 131 supports the wireless LAN provision, i.e. IEEE802.11x of the Institute of American Electrical and Electronics Engineers (IEEE). The short-range communication module 132 wirelessly performs short-range communication with an external device 100, under a control of the controller 110. The short-range communication scheme can include a Bluetooth communication scheme, an Infrared Data Association (IrDA) scheme, a Wi-Fi Direct communication scheme, a Near Field Communication (NFC) scheme, and the like.

The electronic device 100 can include at least one of the mobile communication module 120, the wireless LAN module 131 and the short-range communication module 132. For example, the electronic device 100 can include a combination of the mobile communication module 120, the wireless LAN module 131 and the short-range communication module 132, according to its performance.

The multimedia module 140 can include at least one of the broadcast and communication module 141, the audio reproduction module 142, or the video reproduction module 143. For example, the multimedia module 140 can include other combinations as well as the combination of the broadcast and communication module 141, the audio reproduction module 142 and the video reproduction module 143. The broadcast and communication module 141, under a control of the controller 110, is capable of receiving broadcasting signals, i.e. TV broadcasting signals, radio broadcasting signals, and data broadcasting signals, and additional broadcasting information, i.e. Electric Program Guide (EPS) and Electric Service Guide (ESG), which are transmitted from broadcasting stations, through broadcast and communication antennas (not shown). The audio reproduction module 142 is capable of reproducing digital audio files, i.e. files having an extension of mp3, wma, ogg, or wav, which are stored or received, under a control of the controller 110. The video reproduction module 143 is capable of reproducing digital video files, i.e. files having an extension of mpeg, mpg, mp4, avi, mov, or mkv, which are stored or received, under a control of the controller 110. The video reproduction module 143 can reproduce the digital audio files.

According to certain embodiments, the multimedia module 140 can include the audio reproduction module 142 and the video reproduction module 143, except for the broadcast and communication module 141.

According to certain embodiments, the audio reproduction module 142 or the video reproduction module 143 of the multimedia module 140 can be included in the controller 110.

The camera module 150 can include at least one of a first camera 151 and a second camera 152, and the first camera 151 or the second camera 152 is capable of taking a stationary image or a video, under a control of the controller 110. According to certain embodiments, the first camera 151 and the second camera 152 can be arranged in the electronic device 100 in various manners. For example, the first camera 151 or the second camera 152 can include an auxiliary light source, i.e. a flash (not shown), to provide an amount of light necessary for photography. The first camera 151 can be disposed on a front surface of the electronic device 100, and the second camera 152 can be arranged on a rear surface of the electronic device 100. Alternatively, the first and second cameras 151 and 152 can be adjacently arranged at a distance of 1 cm to 8 cm, so as to photograph a three-dimensional stationary image or a three-dimensional video.

The GPS module 155 is capable of receiving electric waves from a plurality of GPS satellites (not shown) in Earth's orbit, and calculating a position of the electronic device 100 by using a time of arrival from the GPS satellites (no shown) to the electronic device 100.

The input/output module 160 can include at least one of plural buttons 161, a microphone 162, a speaker 162, a vibration motor 164, a connector 165 and a virtual keypad displayed on a touchscreen unit 160. According to certain embodiments, the input/output module 190 can include at least one of plural buttons 161, a microphone 162, a speaker 162, a vibration motor 164, a connector 165 and a virtual keypad displayed on a touchscreen unit 160.

The buttons 161 can be disposed on a front surface, a side surface or a rear surface of a housing of the electronic device 100, and can include an electric power/lock button (not shown), a volume control button (not shown), a menu button, a home button, a back button, and a search button.

The microphone 162 is capable of receiving an input of voice or sound to generate electric signals under a control of the controller 110.

The speaker 163 is capable of outputting sounds, which correspond to various signals, i.e. wireless signals, broadcasting signals, digital audio files, digital video files, and photographing, of the mobile communication module 120, the sub-communication module 130, the multimedia module 140 or the camera module 150, to the exterior of the electronic device 100, under a control of the controller 110. The speaker 163 is capable of outputting sounds, i.e. a button operation sound or a ringtone corresponding to a voice call, corresponding to functions which the electronic device 100 performs. One or more speakers 163 are arranged on a suitable position or positions of the housing of the electronic device 100.

The vibration motor 164 is capable of converting electric signals into mechanical vibrations under a control of the controller 110. For example, the electronic device 100 which stays in a vibration mode operates the vibration motor 164 when receiving a voice call from another device (not shown). One or more vibration motors can be arranged in the housing of the electronic device 100. The vibration motor 164 is capable of operating in response to a touch operation of a user who touches the touch screen 190, and a continuous movement of a touch on the touch screen 190.

The connector 165 can be used as an interface to connect the electronic terminal 100 to the external device (not shown) or electric power source (not shown). The electronic device 100 transmits data which is stored in the storage unit 175 of the electronic device 100, to the external device (not shown) through a wired cable connected to the connector 165, or receives data from the external device (not shown), under a control of the controller 110. Further, the electronic device 100 is supplied with electric power from the electric power source through the wired cable connected to the connector 165, or can charge a battery (not shown) by using the electric power source.

The keypad 166 receives a key input of a user in order to control the electronic device 100. The keypad 166 includes a physical keypad (not shown) arranged on the electronic device 100, a virtual keypad displayed on the touch screen 190, or the touch screen 190. The physical keypad (not shown) arranged on the electronic device 100 can be excluded according to the performance or structure of the electronic device 100.

An earphone (not shown) is inserted in the earphone connecting jack 167 and connected to the electronic device 100.

The sensor module 170 includes at least one sensor for detecting a status of the electronic device 100. For example, the sensor module 170 can include a proximity sensor (not shown) for detecting whether a user comes close to the electronic device 100, an illumination sensor (not shown) for detecting an amount of light surrounding the electronic device 100, a motion sensor (not shown) for detecting movement of the electronic device 100, i.e. a rotation of the electronic device 100, and acceleration or vibration applied to the electronic device 100, a geo-magnetic sensor (not shown) for detecting a point of the compass by using a magnetic field of the Earth, a gravity sensor (not shown) for detecting an action direction of the gravity, and an altimeter (not shown) for detecting altitude by measuring an atmospheric pressure. At least one sensor detects a status of the electronic device, and generates signals corresponding to the detection so as to transmit the signals to the controller 110. Sensors of the sensor module 170 can be added or excluded according to the performance of the electronic device 100.

The storage unit 175 stores signals or data which are input/output in correspondence to operations of the mobile communication module 120, the sub-communication module 130, the multimedia module 140, the camera module 150, the GPS module 155, the input/output module 160, the sensor module 170, and the touch screen 190 under a control of the controller 110. The storage unit 175 can store a control program and an application for controlling the electronic device 100 or the controller 110.

The term "storage unit" refers to the storage unit 175, the ROM 112 in the controller 110, the RAM 113, or a memory card (not shown), i.e. a SD card, and a memory stick, inserted in the electronic device 100. The storage unit can include a non-volatile memory, a volatile memory, a Hard Disk Drive (HDD), and a Solid State Drive (SSD).

Further, according to certain embodiments, the storage unit 175 collects information of at least one object which is selected from an electronic document including a plurality of objects, as user information, and stores a user information table of the electronic document made based on the collected user information. The user information table can be present in correspondence to the number of electronic documents.

The electric power supply unit 180 supplies one or more batteries (not shown) which are disposed in the housing of the electronic device 100, with electric power under a control of the controller 110. One or more batteries (not shown) supply the electronic device 100 with electric power. Further, the electric power supply unit 180 is capable of supplying electric power to the electronic device 100 from the external electric power source (not shown) through the wired cable connected to the connector 165. Further, the power supply unit 180 can supply the electronic device 100 with electric power wirelessly input from the external electric power source by using a wireless charging technique.

The touch screen 190 provides a user with a User Interface (UI) corresponding to various services, i.e. a voice call, a data transmission, broadcasting, and photographing. The touch screen 190 transmits analog signals, which correspond to at least one touch input into the UI, to the touch screen controller 195. The touch screen 190 receive at least one touch caused by a body of the user, i.e. fingers including a thumb, or an input means capable of touching, i.e. a stylus pen. Further, the touch screen 190 can receive a continuous movement of at least one touch among the touches. The touch screen 190 transmits signals, which correspond to the continuous movement of the input touch, to the touch screen controller 195.

In certain embodiments, a touch is not limited to a contact of the touch screen 190 with the user's body, or the input means capable of touching, and includes a hovering or a non-contact in which a distance between the touch screen 190 and the user's body or the input means capable of touching is less than 1 mm. A distance of the non-contact detected by the touch screen 190 can be changed according to the performance or the structure of the electronic device 100.

The touch screen 190 can be implemented by a resistive type, a capacitive type, an infrared type, or an ultrasonic wave type of touch screen.

According to certain embodiments, the touch screen 190 can display one or more recommended items which show user interest information of in the electronic document.

The touch screen controller 195 converts analog signals received from the touch screen 190 into digital signals, i.e. X and Y coordinates, and then transmits the digital signals to the controller 110. The controller 110 controls the touch screen 190 by using the signals received from the touch screen controller 195. For example, the controller 110 allows a short-cut icon (not shown), which is displayed on the touch screen 190, to be selected, or executes the short-cut icon, in response to the touch. Further, the touch screen controller 195 can be included in the controller 110.

Operation of processing the information of the electronic document in the above mentioned electronic device will be described in detail with reference to FIGS. 2 to 21.

Figure 2:
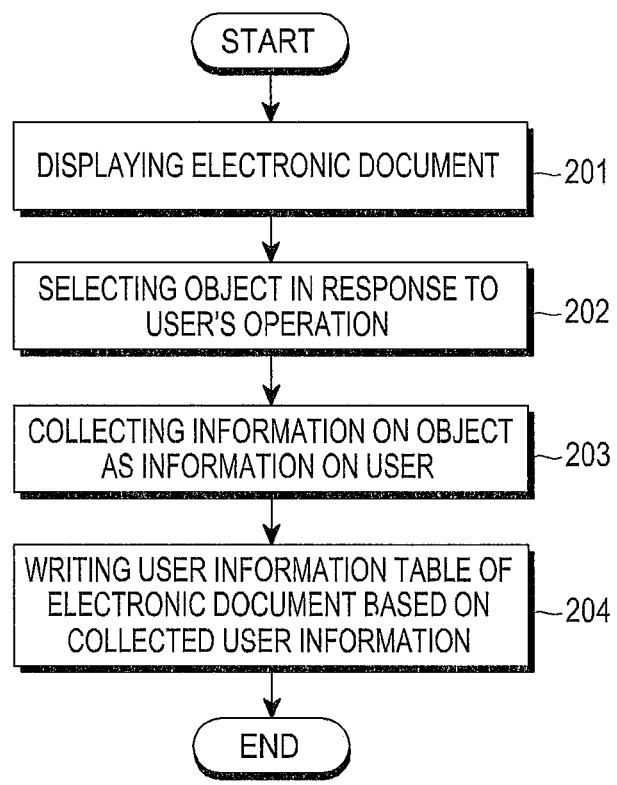
FIG. 2 illustrates a process of collecting user information from the electronic document in the electronic device according to certain embodiments.
Figure 3A:
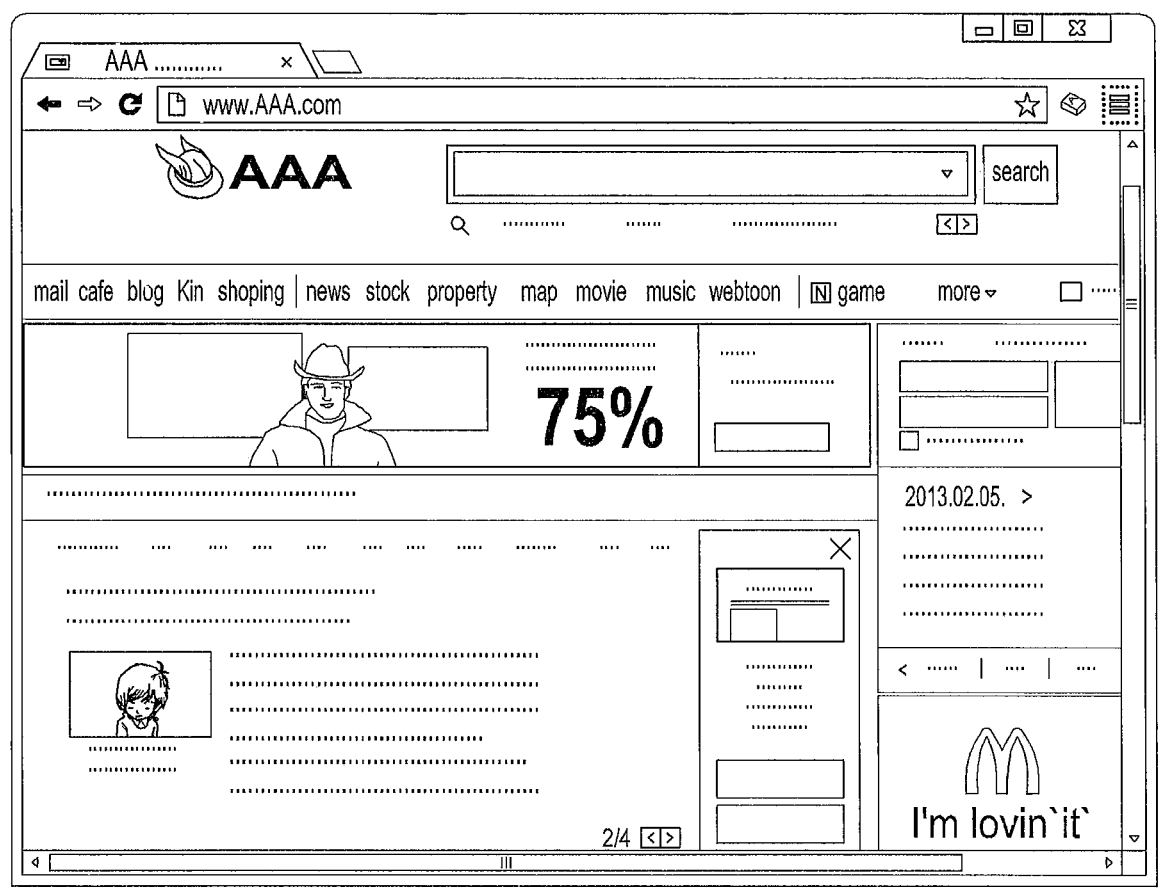

FIG. 2 is a flowchart illustrating an operation of collecting user information of the electronic document in the electronic device according to certain embodiments, and FIGS. 3A, 3B and FIG. 4 are views illustrating a collection of the user information in the electronic device according to certain embodiments.

Operations described with reference to FIG. 2 below are performed, for example, by the controller 110. Referring to FIG. 2, in operation 201, an electronic document including a plurality of objects is displayed. In operation 202, an object of the electronic document is selected. In operation 203, the controller 110 collects information of the selected object as user information.

Operations 202 and 203 can be repeatedly performed. In operation 204, the controller 110 makes a user information table of the electronic document based on the user information collected in operation 203.

The process of FIG. 2 will be described below with reference to FIG. 3A to 4. According to certain embodiments, in FIGS. 3A to 4, it is described as an example that the user information includes an action, a tag, an ID or Parent ID, a name, a title or alt, a class or parent, a herf, a value or innerText, prev URL and current URL, and a structural element of a user information table which is made based on the user information includes an action ID, an action, a tag, an ID or parent ID, a name, a Title or alt, a class or parent, a herf, a value or innerText, a prev URL, a current URL, a count and Last Time. However, the user information and the structural element of the user information table can be variously changed according to a kind of electronic document to be analyzed.

The action ID is a number assigned to an action of a user, and the action indicates action information of a user such as a link open, a text input and a click. Further, the Tag is a tag name of an object in which the action information of the user is performed, and the ID or Parent ID, the Name, the Title or alt and the class or parent indicates a property of an object in which the user's action is performed or a property of the nearest parent. The parent ID means an ID for a previous operation to be distinguished from another operation in a case of continuous operations, and means a title throughout an html document in a case of the Title. For example, an AAA of "AAA" site can be a title. Further, the Alt means that text information for a picture is shown in the tag form, and the Class means representative lists of objects into which an html maker classifies many objects inserted in an html.

The herf indicates a URL to be moved, and the value or the innerText denotes a character input in an input field, or a text included within <a> such as <a>Inner Text</a>. The prev URL indicates an URL of a previous page when a movement is performed by a link, and the current URL denotes a URL of a current page. The count indicates a frequency of a corresponding action which a user performs, and the Last Time denotes a time at which the corresponding action of the user was last performed. According to certain embodiments, in FIG. 3A to 4, the count and the Last Time can be omitted.

As shown in FIG. 3A, in a case where a user inputs an URL of "www.AAA.com" to contact to a portal site of "AAA", so that a main page is displayed, when a text of "weather" is input via a keyword in a search window 301 of the main page of the AAA site and then a search is performed, the controller 110 detects information from HTML languages constituting the main page of the AAA site, depending on the keyword input of "weather" depicted by (a) of FIG. 3B, and collects the detected information as user information shown in (a) of FIG. 3B.

When "sports page" is selected from the main page, the controller 110 detects information from the HTML languages constituting the main page as "sports page" as depicted by (b) of FIG. 3B, and collects the detected information as user information (Action ID: 2, Action: Link open) as depicted by (b) of FIG. 4B. At this time, the controller 110 collects "sports page", "entertainment page" tied by "div", "economic page", "news stand page", and "AAA news page" detected as shown in (b) of FIG. 3B as user information (Action ID: 2, Action: sibling-2) as shown in (b) of FIG. 4.

After the user moves to a sports page of an AAA site as the "sports page" is selected, the controller 110 detects information from HTML languages constituting a "sports page" when a "baseball page" is selected from the sports page as shown in (c) of FIG. 3B, and collects the detected information as a user information (Action ID: 3, Action: Link open). At this time, the controller 110 collects the "sports home" tied by the "baseball page" and the "div", a "foreign baseball", a "football" as user information (Action ID: 3, Action: sibling-3) as shown in (c) of FIG. 3B, among the detected information as shown in (c) of FIG. 4.

In a case where the baseball page of the AAA site is moved as the "baseball page" is selected from the sports page, when a user moves the main page of the AAA site and selects a "specific news page, i.e. LG development~", the controller 110 detects information from HTML languages constituting the "specific news page, i.e. LG development~" as the "specific news page, i.e. LG electronics development~" is selected as shown in (d) of FIG. 3B, and collects the detected information as user information (Action ID: 4, Action: Link open) as shown in (d) of FIG. 4. At this time, the controller 110 collects "specific news pages, i.e. where to buy~, a speed of the Internet in the world~, and a caloric bomb~" tied by the "specific news page, i.e. LG electronics development~" and "div" as user information (Action ID: 4, Action: sibling-4) as shown in (d) of FIG. 4, among the detected information as shown in (d) of FIG. 3B.

The controller 110 makes a user information table of the AAA site as shown in FIG. 4, based on the collected user information.

According to certain embodiments, making the user information table for a previous electronic document is completed when an electronic document is loaded through a URL input. Therefore, during the collection of the user information as shown in FIGS. 3A to 3B, when a new web page is loaded and displayed through the URL input, or when a page of the AAA site is loaded and displayed again, the controller 110 completes the making of the user information table of the AAA site as shown in FIG. 4, and collects new user information or displays at least one recommended item which shows interest information of the user based on the user information table of the AAA site.

Figure 5:
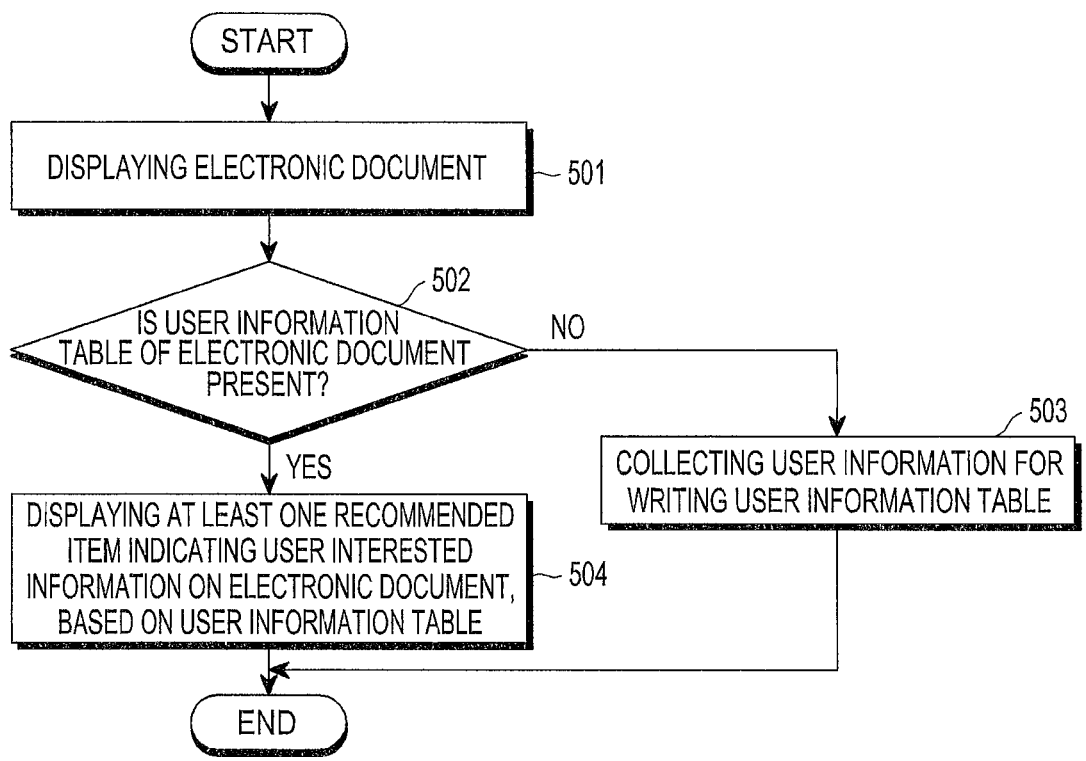
FIG. 5 illustrates a process of displaying recommended item of a user interest information in the electronic document of the electronic device according to certain embodiments.
Figure 7A:
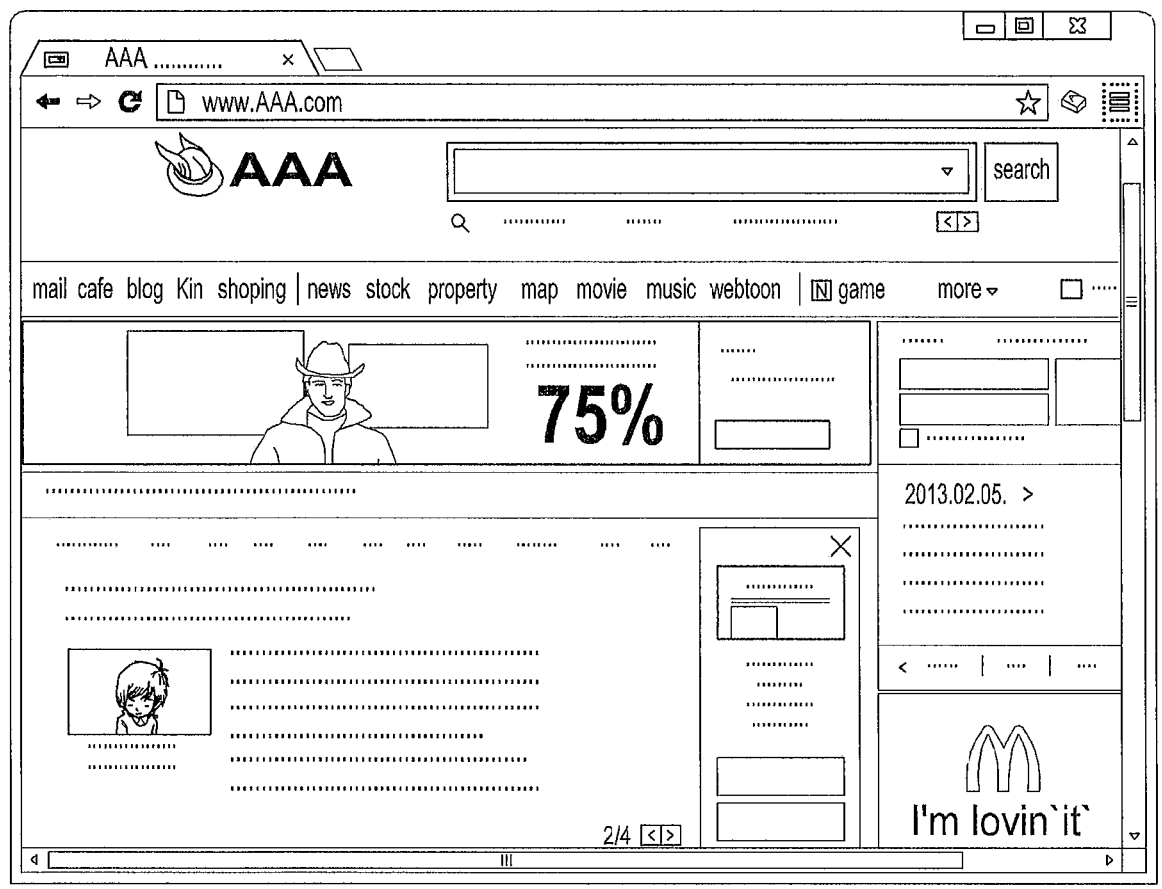
FIGS. 7A and 7B illustrate an operation of displaying the recommended item of user interest information in the electronic documents of the electronic device according to certain embodiments.
Figure 7B:
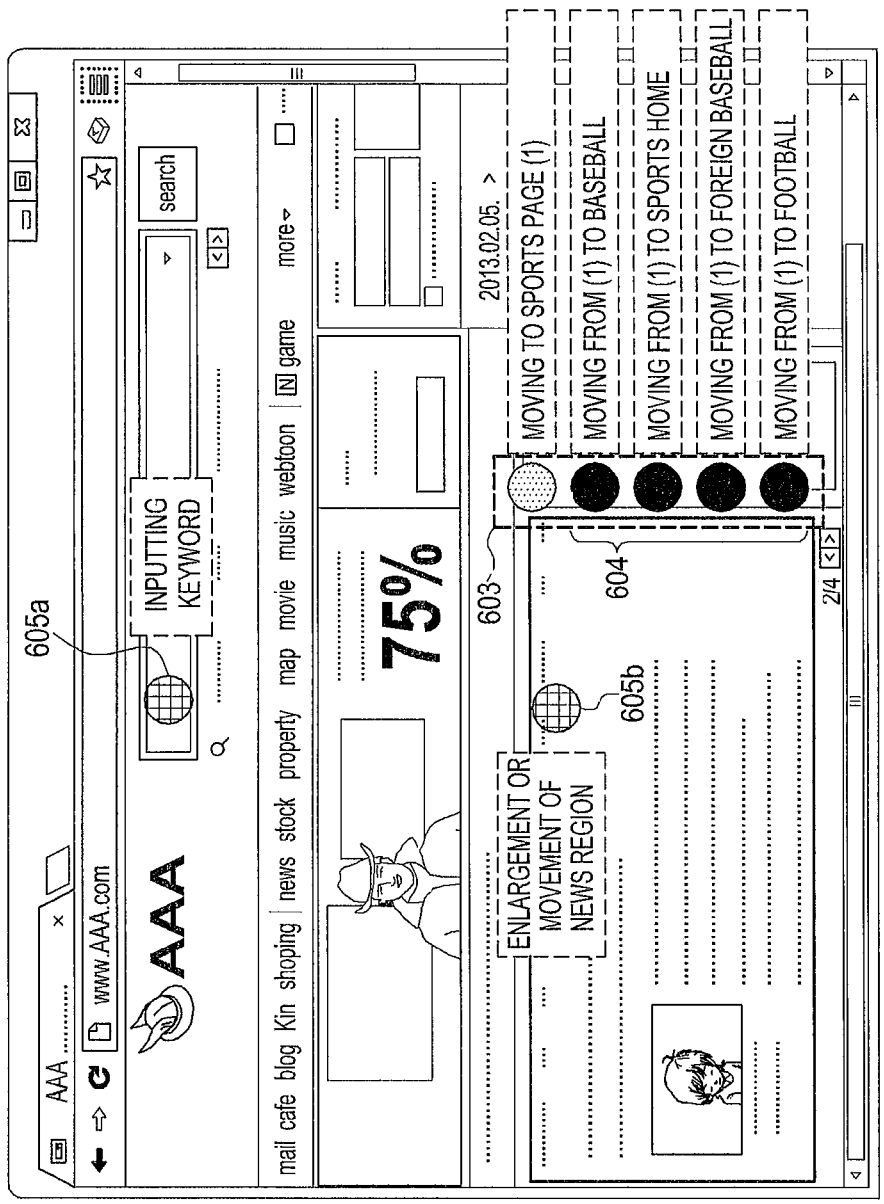
Figure 8:
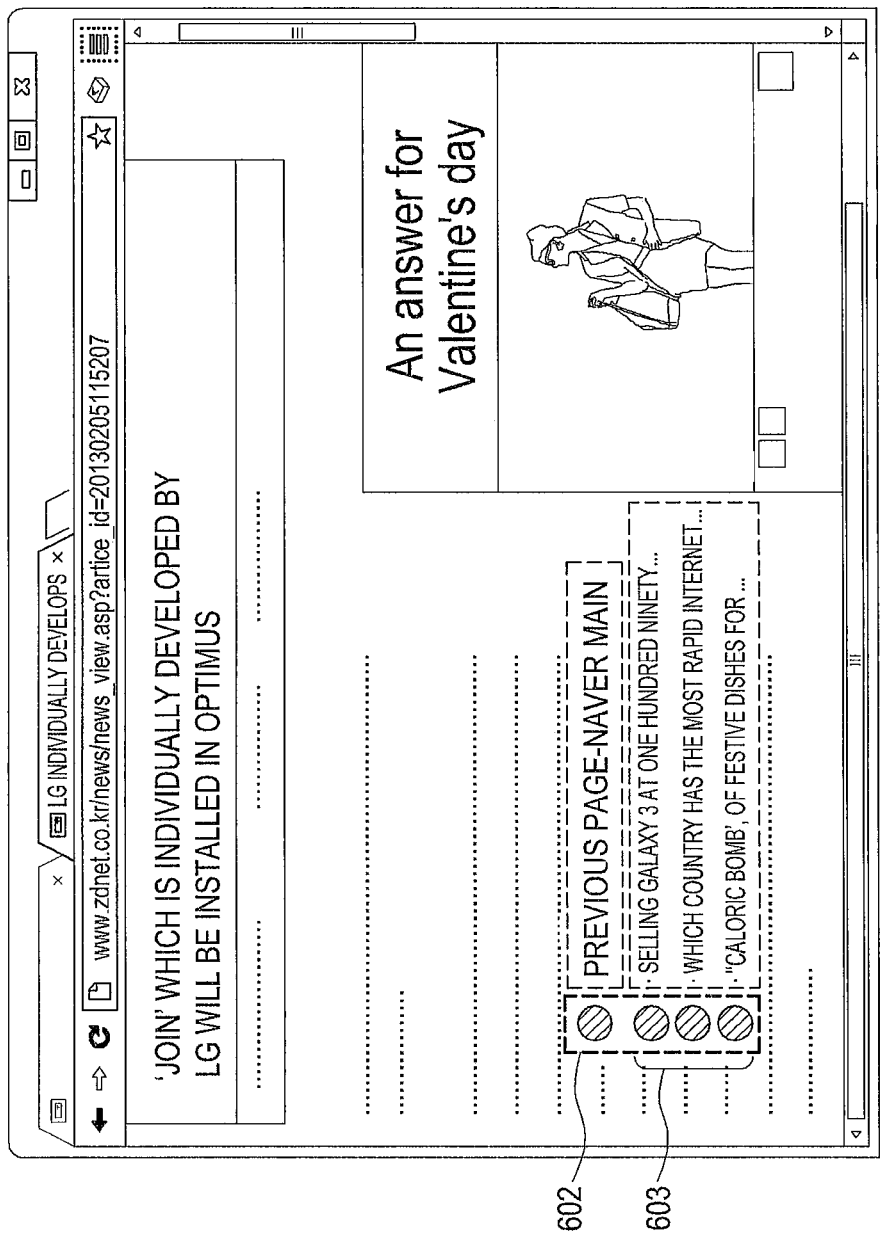
FIG. 8 illustrates an operation of displaying the recommended item of user interest information in the electronic documents of the electronic device according to certain embodiments.

FIG. 5 illustrates a process of displaying a recommended item indicating interest information of a user in an electronic document of an electronic device according to certain embodiments, and FIGS. 6 to 8 are views illustrating an operation of displaying the recommended item indicating the interest information of the user in the electronic document of the electronic device according to certain embodiments.

Referring to FIG. 5, in operation 501, the electronic document is loaded and displayed.

In operation 502, the controller 110 determines whether a user information table of the electronic document is present in the storage unit 175. In a case where it is determined that the user information table of the electronic document is not present in the storage unit 175 in operation 502, the controller 110 prepares to collect user information for making the user information table in operation 503. However, when it is determined that the user information table of the electronic document is present in the storage unit 175 in operation 502, the controller 110 displays at least one recommended item indicating interest information of the user based on the user information table of the electronic document in operation 504.

Figure 6A:
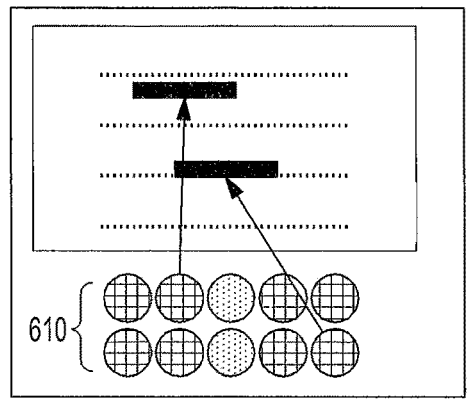
FIGS. 6A and 6B illustrate an operation of displaying the recommended item of user interest information in the electronic documents of the electronic device according to certain embodiments.
Figure 6B:
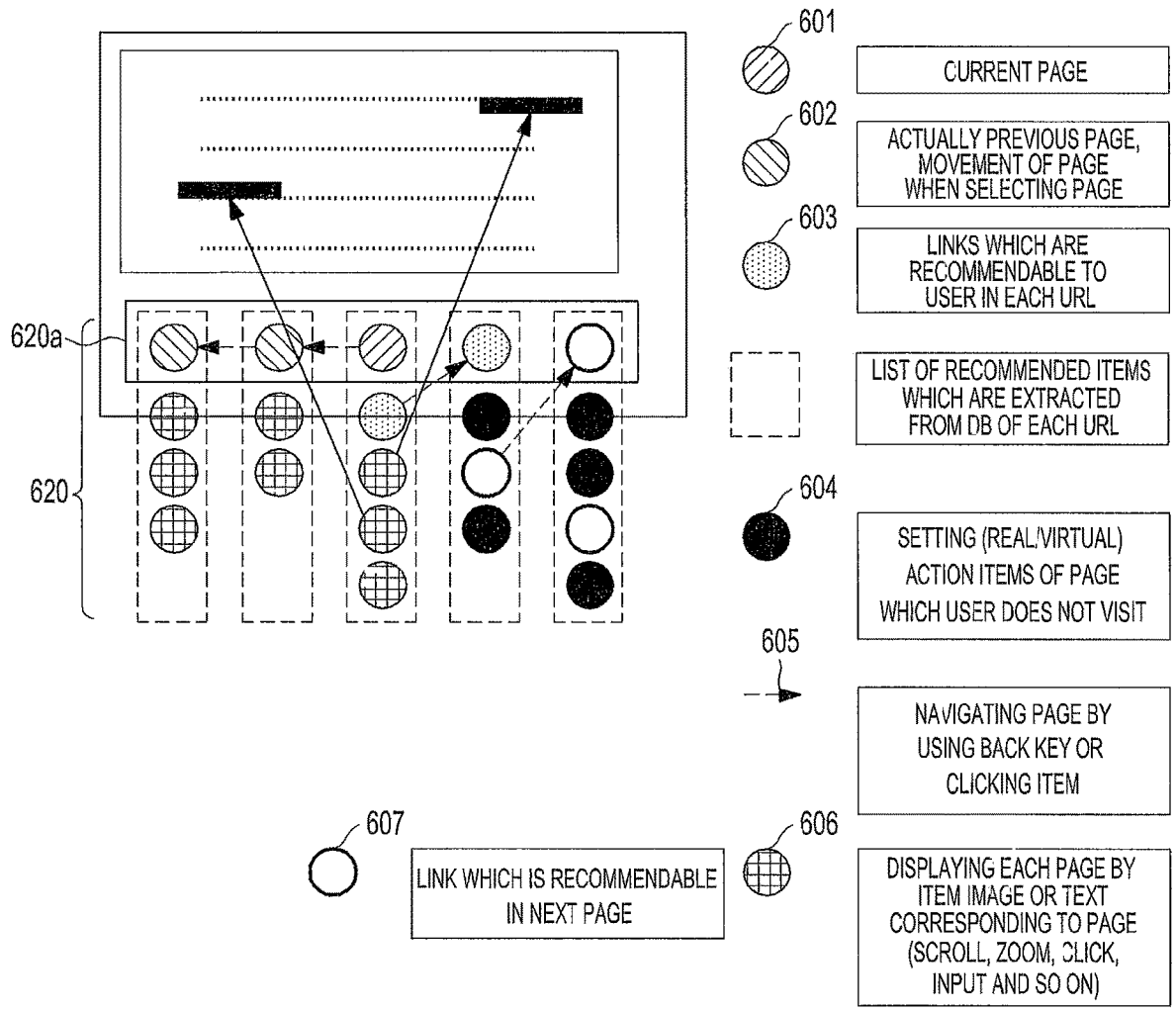

In operation 504, at least one recommended item is provided to a site map of a current page and displayed as shown in FIG. 6A, or provided to a backward or forward site map by using the URL and displayed as shown in FIG. 6B.

In FIG. 6B, the recommended items detected in each URL are provided in a tree form, respectively, based on the user information table, and at least one recommended item 620 provided in the tree form is navigated and displayed.

In FIG. 6B, recommended items 620a of one or more recommended items 620 are displayed as main items in a current page, and recommended items which are classified as a lower level of each recommended main item are entirely or sequentially displayed according to a selection.

In FIG. 6B, a reference numeral 601 indicates a recommended item of a current page indicating the current page, a reference numeral 602 indicates a recommended item of a previous page for a movement to the previous page, a reference numeral 603 denotes a recommended item of a recommended page for a movement to the recommended page, and a reference numeral 604 denotes a recommended item of an action to be recommended. A reference numeral 606 shows a recommended item of a recommended action, and a reference numeral 607 denotes a recommended item of a page link for the page link to be recommended.

Next, an operation of displaying at least one recommended item of an electronic document will be described with reference to FIGS. 7A to 8. When a main page of the AAA site is loaded through the URL and displayed as shown in FIG. 7A, the controller 110 determines whether a user information table of the AAA site is present in the storage unit 175. If the user information table of the AAA site is present in the storage unit 175, the controller 110 identifies an object of a recommended item in the user information table of the AAA site as shown in FIG. 4.

Firstly, the controller 110 detects a "sports" item of which an Action ID is 2 through a first condition by using a Tag.

```
<first condition>
    -getElementByTagname("a") WHERE element.href == (SELECT
    href FROM
DB).
```

The controller 110 detects a "keyword input" item, a "sports" item and a "specific news, i.e. LG development~" item, of which Action IDs are 1, 2 and 4, through a second condition by using an ID, and the "sports" item of which the Action ID is 2 is omitted because it is detected in the first condition.

```
<second condition>
    getElementByID("query")//search window
        getElementByID("newscast_top")//news category
        getElementByID("InbTopMenuImage_1")//to be recommended
is not detected as a link which can be recommended in a next page
        getElementByID("cast_articles")//article list.
```

The controller 110 detects a "keyword input" item, a "sports" item and a "specific news, i.e. LG development~" item, of which Action IDs are 1, 2 and 4, through a third condition by using a class, a name and the like, and the "keyword input" item, the "sports" item and the "specific news, i.e. LG development~", of which the Action IDs are 1, 2 and 4 are omitted because they are detected in the first and second conditions.

```
<third condition>
    getElementByClass("input_text")
        getElementByName("query")
```

Next, the controller 110 detects a "baseball item" which is an item of a previously contacted page and of which an Action ID is 3, through a fourth condition.

```
<fourth condition>
SELECT ActionID FROM DB WHERE prevURL = www.AAA.com
AND currentURL
= "sports.AAA".
```

The controller 110 detects a "sports home" item, a "foreign baseball" item and a "football" item which are similar information (sibling) of a previously contacted page and of which a sibling of Action ID 3 is 3, through a fifth condition below.

```
<fifth condition>
    SELECT * FROM DB WHERE Action = "sibling-3".
```

When corresponding items are detected through the fourth condition and the fifth condition, the controller 110 provides information on whether the previously contacted page is linked to the current page by an option, through an item (a recommended item of an action to be recommended). When the "baseball" item is detected through the fourth condition, the controller 110 displays a page corresponding to the "baseball" item, and identifies and displays the presence or the absence of the "sports home" item, the "foreign baseball" item and the "football" item which are detected through the fifth condition.

Otherwise, when the "baseball" item is detected through the fourth condition, the controller 110 does not display a page corresponding to the "baseball" item, and identifies and displays the presence or the absence of a corresponding item if any one of the "sports home" item, the "foreign baseball" item and the "football" item which are detected through the fifth condition is selected.

The first to fifth conditions can be changed by the priority order stored in the user information table.

When the recommended item is detected from the user information table through the first to fifth conditions, the controller 110 displays recommended items 603, 604, 605a and 605b on the main page of the AAA site as shown in FIG. 7B.

On the other hand, when a page of the specific news, i.e. LG electronics development~ item is loaded and displayed by clicking the specific news, i.e. LG electronics development~ item in the main page, the controller 110 detects the "specific articles, i.e. where to buy~, the speed of the Internet in the world~, and a caloric bomb", which are similar to the specific news, i.e. LG electronics development~, and of which an Action ID is 4, and displays a recommended item 602 of the previous page for a movement to a previous page, and a recommended page 603 for a movement to a recommended page.

```
<sixth condition>
    - SELECT ActionID FROM WHERE href = "zdnet.co.kr" AND
    previousURL =
    "AAA.com".
```

An operation of identifying an object of a recommended item in a user information table through the first to sixth conditions has been described according to certain embodiments. However, the object of the recommended item can be identified in the user information table through various methods without limitation to the first to sixth conditions.

Figure 9:
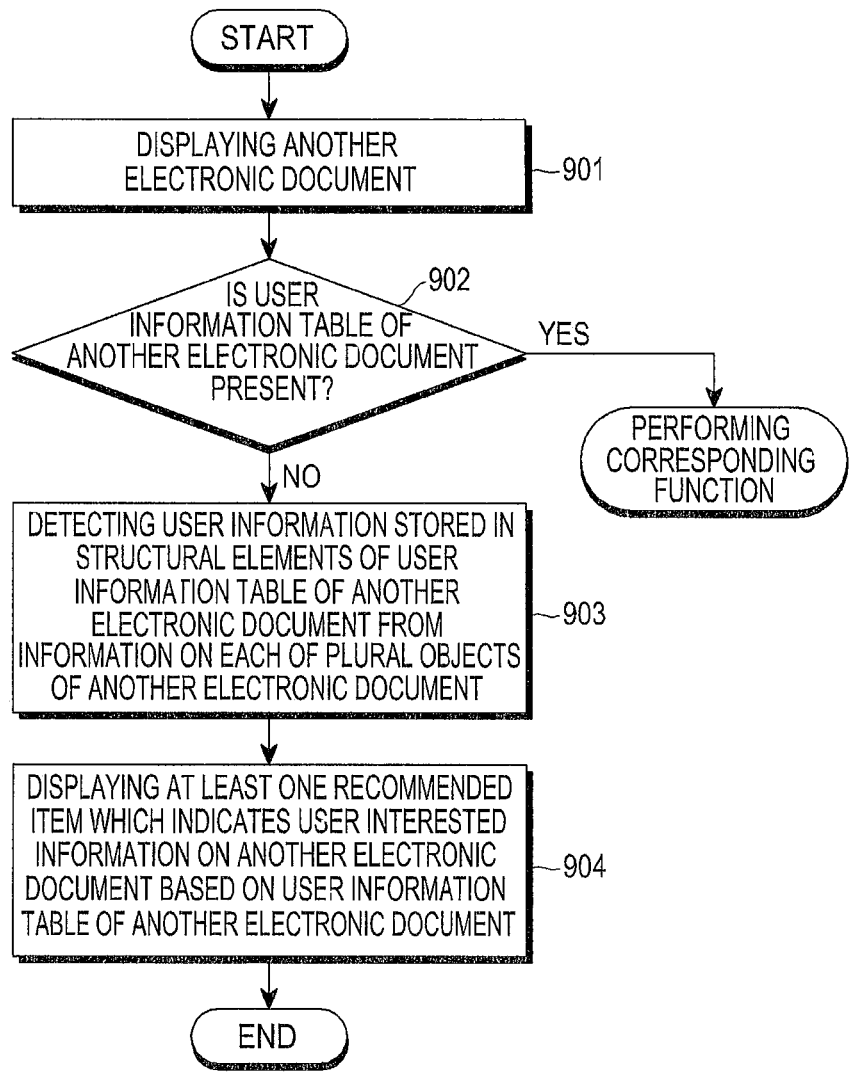
FIG. 9 illustrates a process of displaying recommended items in the electronic document of the electronic device according to certain embodiments, based on user interest information of another electronic document.

FIG. 9 is a flowchart illustrating a process of displaying recommended items in an electronic document of the electronic device according to certain embodiments, which is based on user information of another electronic document, and FIGS. 10A to 10E is a view illustrating the process in FIG. 9.

Referring to FIG. 9, in operation 901, an electronic document which is different from the electronic document of FIG. 5 is loaded and displayed.

In operation 902, the controller 110 determines whether a user information table of another electronic document is present in the storage unit 175. In operation 902, if it is determined that the user information table of another electronic document is not present in the storage unit 175, in operation 903, the controller 110 can detect user information which is stored in structural elements of the user information table of the electronic document, among information on each of plural objects of another electronic document. In operation 904, the controller 110 controls the at least one recommended item to be displayed in another electronic document, based on the user information detected from the user information table of the electronic document.

The process of FIG. 9 will be described below with reference to FIGS. 10A to 10C.

Figure 10A:
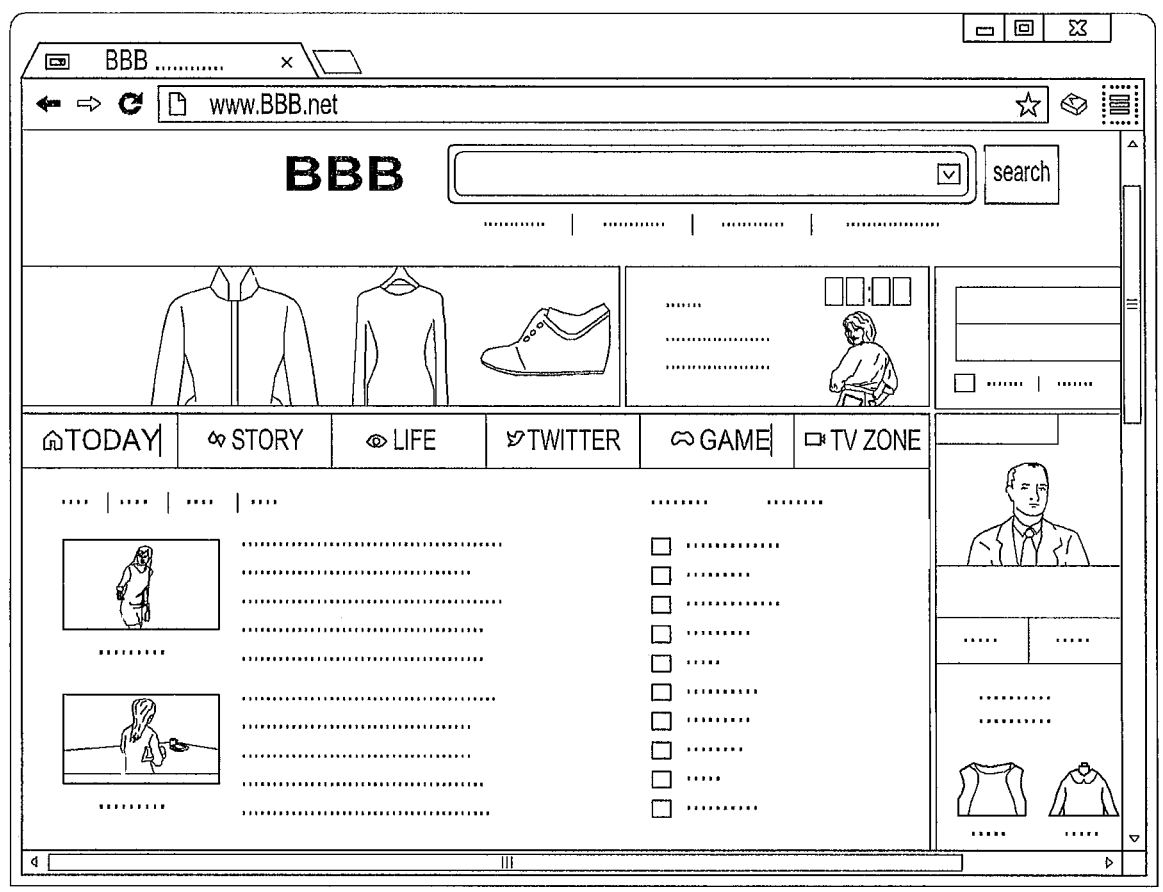

In a case where a main site of a BBB site is loaded through a URL input as shown in FIG. 10A, if a user information table of the BBB site is not present, the controller 110 detects information on each of the plural objects constituting the main page of the BBB site from HTML languages which construct the main page of the BBB site, and determines whether the detected information is present in the user information table of the AAA site as shown in FIG. 4.

Figure 10C:
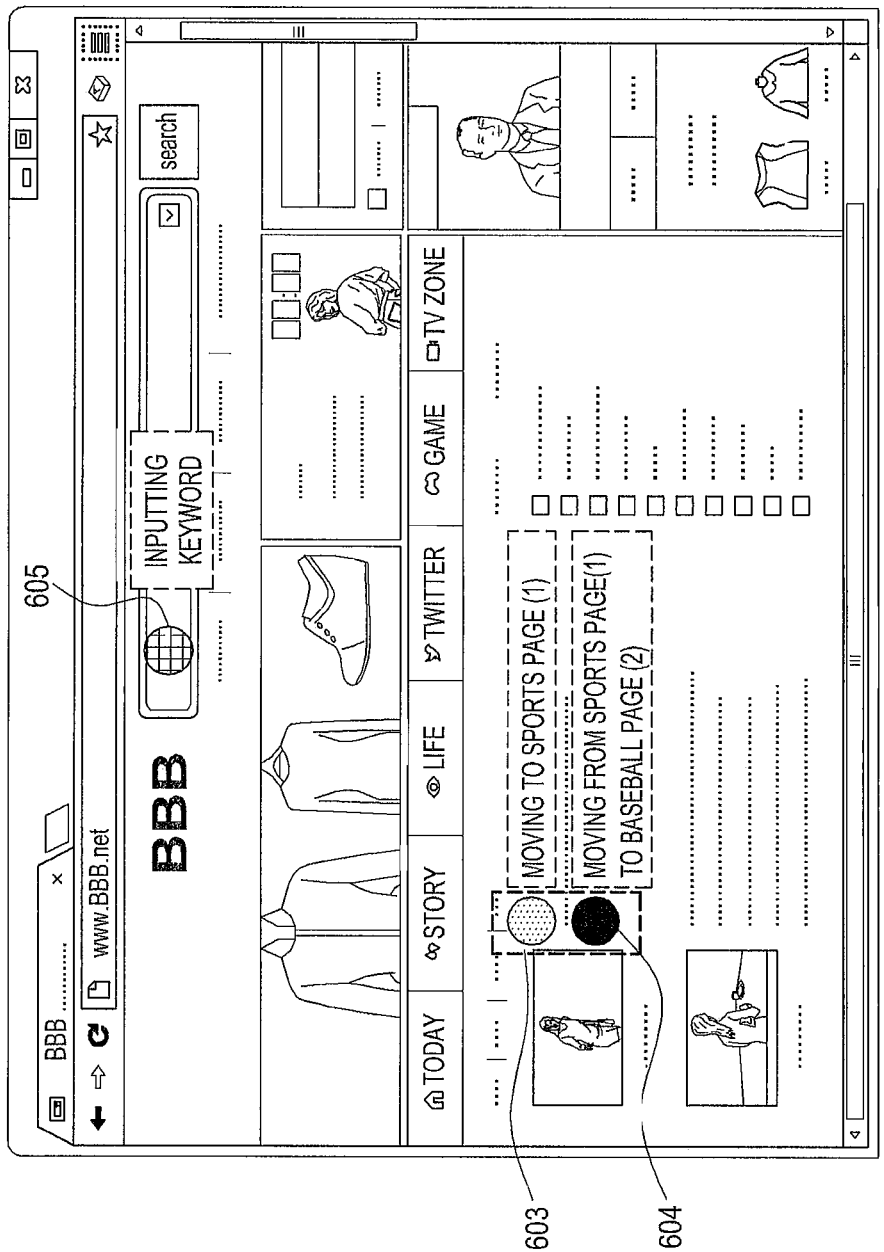

When detecting "keyword input field" information shown in (a) of FIG. 10B from the HTML languages constructing the main page of the BBB site, "sports" page information shown in (b) of FIG. 10B, and "baseball" page information in a sports page shown in (c) of FIG. 10B, the controller 110 can display at least one of recommended items 603, 604 and 605 in the main page of the BBB site as shown in FIG. 10C, based on the user information table of the AAA site shown in FIG. 4.

Figure 11A:
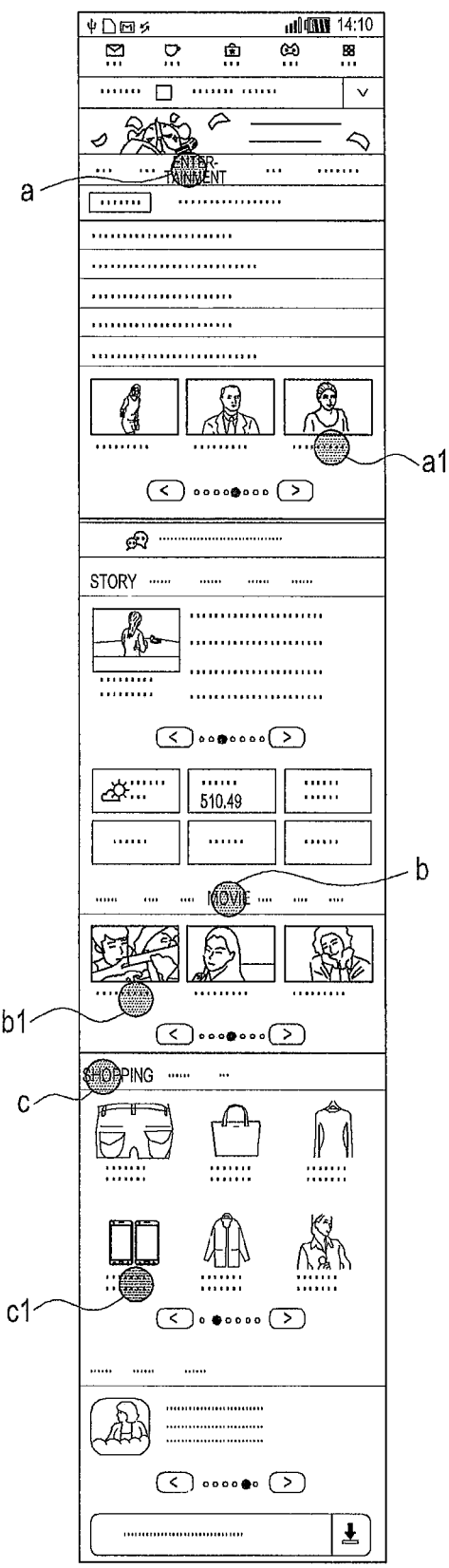
FIGS. 11A and 11B illustrate an operation of allowing a user to move to an interest region using recommended items in the electronic document of the electronic device according to certain embodiments.
Figure 11B:
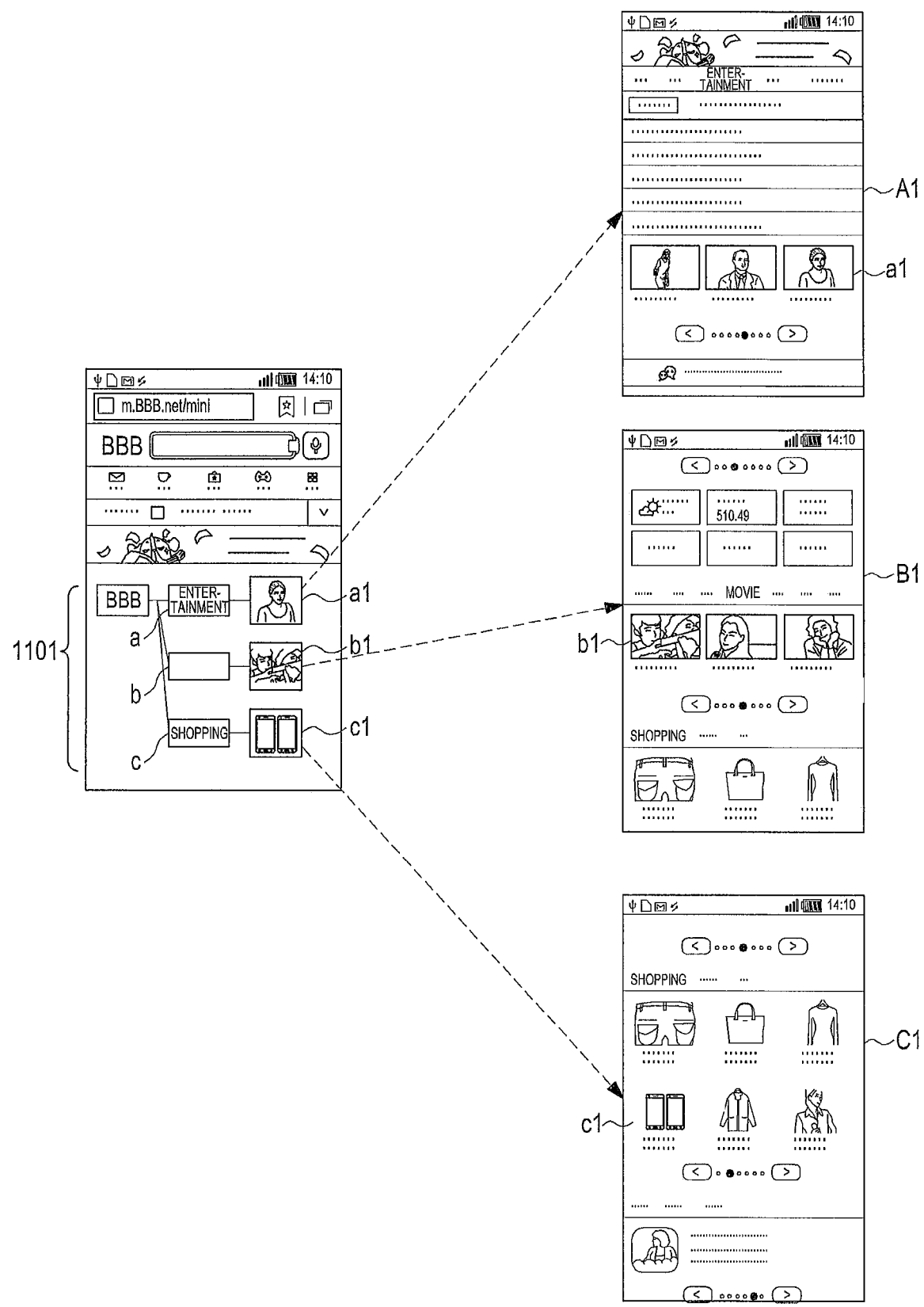

FIGS. 11A and 11B are views illustrating an operation of allowing a user to move to an interest region using recommended items in the electronic document of the electronic device according to certain embodiments.

In FIGS. 11A and 11B, an operation is shown of displaying one or more recommended items indicating interest information of the user as a menu allowing the user to directly move from a page of the electronic document to the interest region.

As shown in FIG. 11A, when the user selects a "specific entertainment news" item from an "entertainment" item, selects a "specific movie news item from a "movie" item, and a "specific shopping" item from a "shopping" item, in a corresponding page of the BBB site, the controller 110 makes the items which are selected from the corresponding page of the BBB site by the user on the user information table of the BBB site.

As shown in FIG. 11B, when the corresponding page of the BBB site is loaded and displayed, one or more recommended items 1101 which is previously moved from the corresponding page of the BBB site to a position selected by the user and can be displayed in the tree form, based on the user information table in the predetermined region of the page. As shown in FIG. 11B, it is described that the one or more recommended items are displayed in the tree form. However, the display of the one or more recommended items is not limited to the tree form, and can be displayed in various forms.

In a case where a first recommended item a1 is selected from the one or more recommended items 1101, if the recommended item a1 is not displayed in a displaying region of the display unit which displays the corresponding page of the BBB site, the controller 110 moves to an interest region at which the recommended item a1 is positioned and controls the recommended item a1 to be displayed in a display region on the display unit, as shown by A1 in FIG. 11B.

In a case where a second recommended item b1 or a third recommended item c1 which is not displayed in a display region of the display unit is selected, the controller 110 controls the second or third recommended item b1 or c1 to be displayed as shown by B1 or C1 in FIG. 11B.

Figure 12A:
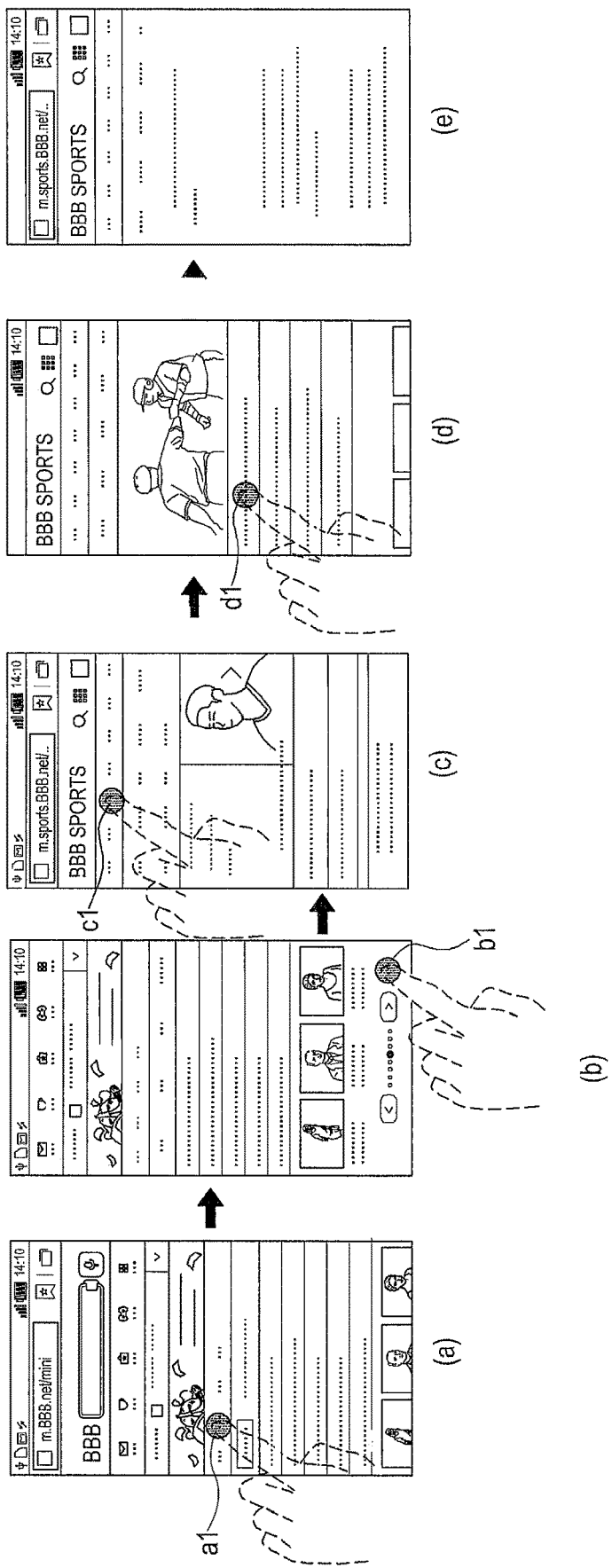
FIGS. 12A and 12B illustrate an operation of allowing a user to move to an interest page using recommended items in the electronic document of the electronic device according to certain embodiments.
Figure 12B:
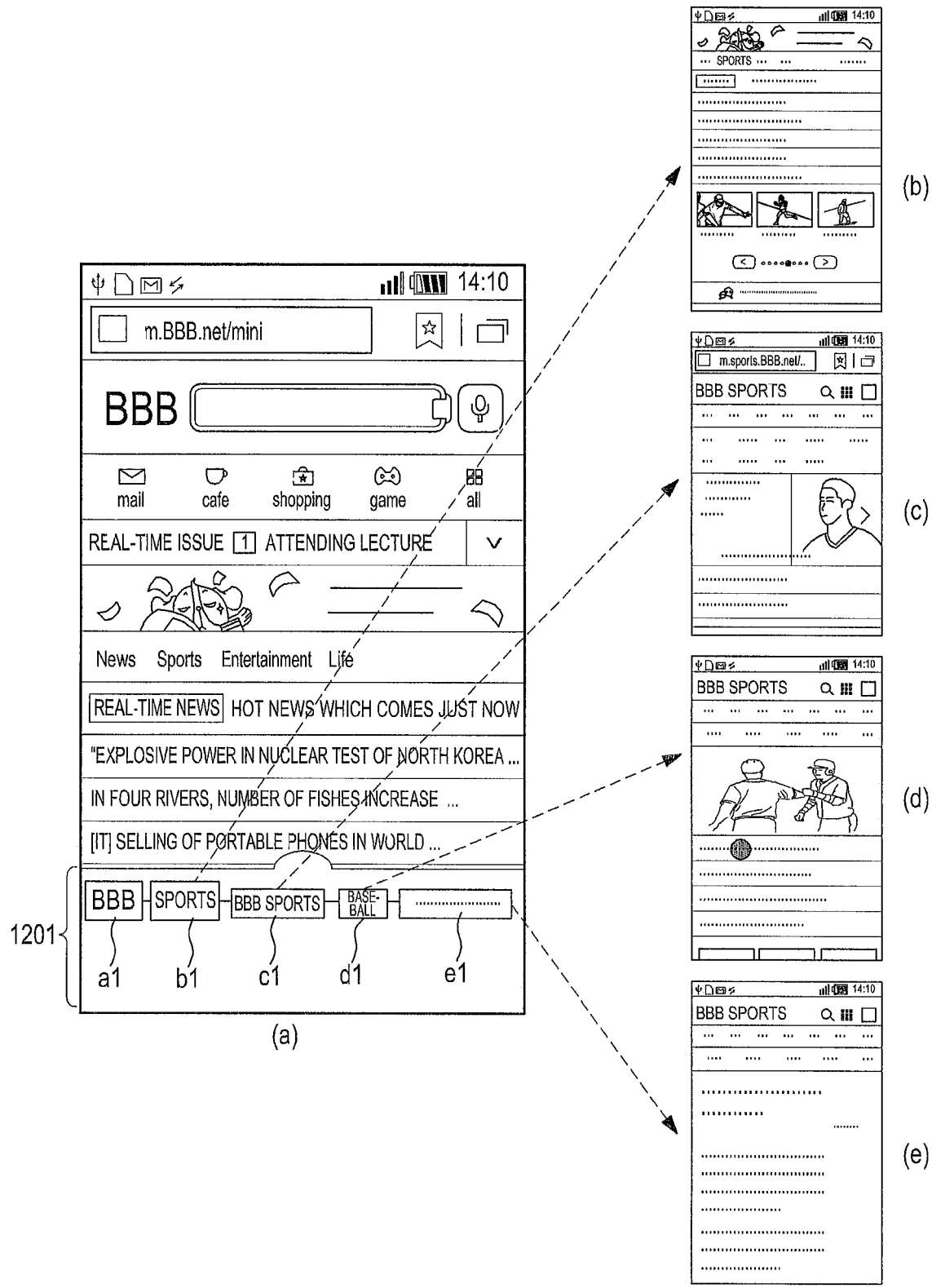

FIGS. 12A and 12B are views illustrating an operation of allowing a user to move to an interest region using recommended items in the electronic document of the electronic device according to certain embodiments.

In FIGS. 12A and 12B, an operation is shown of displaying one or more recommended items indicating the interest information of the user as a menu through which a user directly moves to an interest page of an electronic document or an interest page of the electronic document and another electronic document. In FIG. 12A, an operation is shown of writing items selected by an action of a user shown by (a) to (e) and page information corresponding to the items on a user information table of the BBB site.

In FIG. 12B, in a case where a main page of the BBB site is loaded and displayed, an operation is shown of providing one or more recommended items 1201 as a user customized electronic document map, based on the user information table of the BBB site.

Figure 13:
FIG. 13 illustrates recommended items provided in the form of a tree in the electronic document of the electronic device according to certain embodiments.

FIG. 13 is a view illustrating recommended items provided in the form of a tree in the electronic document of the electronic device according to certain embodiments.

In FIG. 13, in a case where a plurality of interest pages selected by a user are present, one or more recommended items are displayed in the tree form in the main page of the BBB site.

Figure 14A:
FIGS. 14A and 14B illustrate an operation of displaying an interest region in the electronic document of the electronic device according to certain embodiments.
Figure 14B:
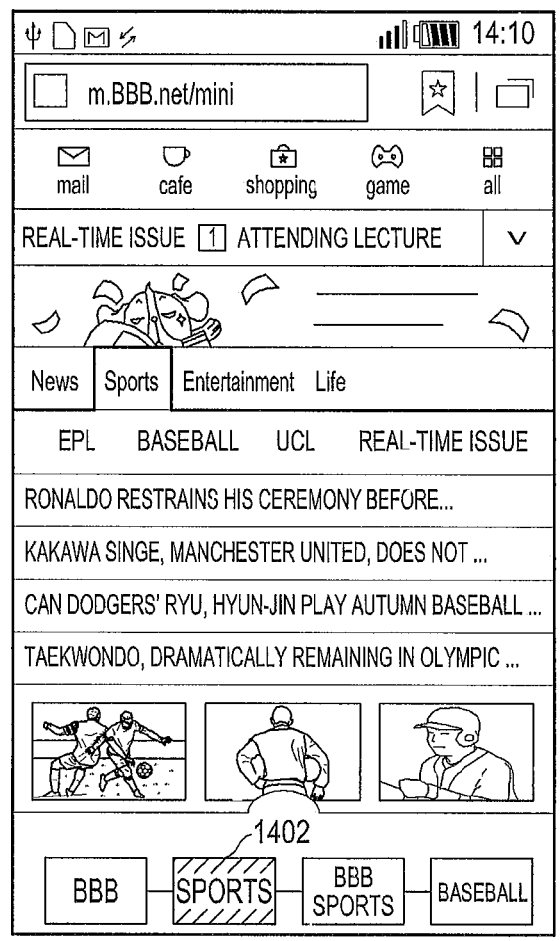

FIGS. 14A and 14B are views illustrating an operation of displaying an interest region in the electronic document of the electronic device according to certain embodiments.

In FIG. 14, when the electronic document is displayed, an interest region is detected from a page of the electronic document based on a user information table of the electronic document. Otherwise, when the detected and interest region is not displayed in the display region of the display unit, with moving to the interest region, the interest region is displayed in the display region.

When a specific page of the electronic document is displayed in a display region of the display unit, some objects included in the specific page are not displayed. Therefore, when the specific page of the electronic document is loaded and displayed according to certain embodiments, the controller 110 detects an interest region of a user from the specific page based on a user information table of the electronic document, and moves to the interest region and performs an operation of directly displaying the interest region when the interest region is not displayed in a display region of the display unit.

When a specific page of the BBB site is loaded as shown in FIG. 14A, the controller 110 directly moves to a region at which a "news item" 1401 is detected as an interest region of the user and is positioned and displays the "news item" 1401. Otherwise, when the specific page of the BBB site is loaded as shown in FIG. 14B, the controller 110 directly moves to a region at which a "sports item" 1402 is detected as a user interest region and displays the "sports item" 1402.

Figure 15A:
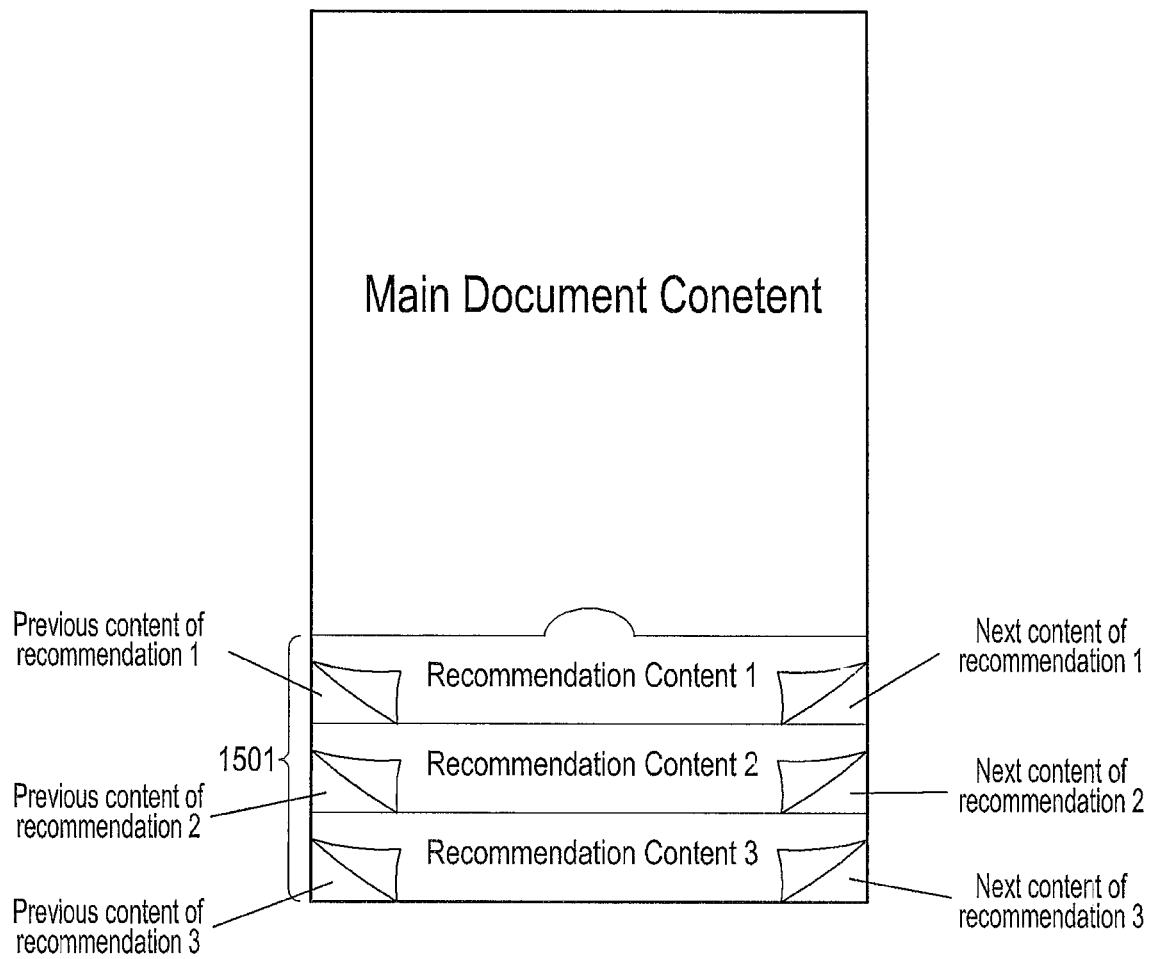
FIGS. 15A, 15B, 15C and 15D illustrate recommended items provided in a paging form in the electronic document of the electronic device according to certain embodiments.
Figure 15B:
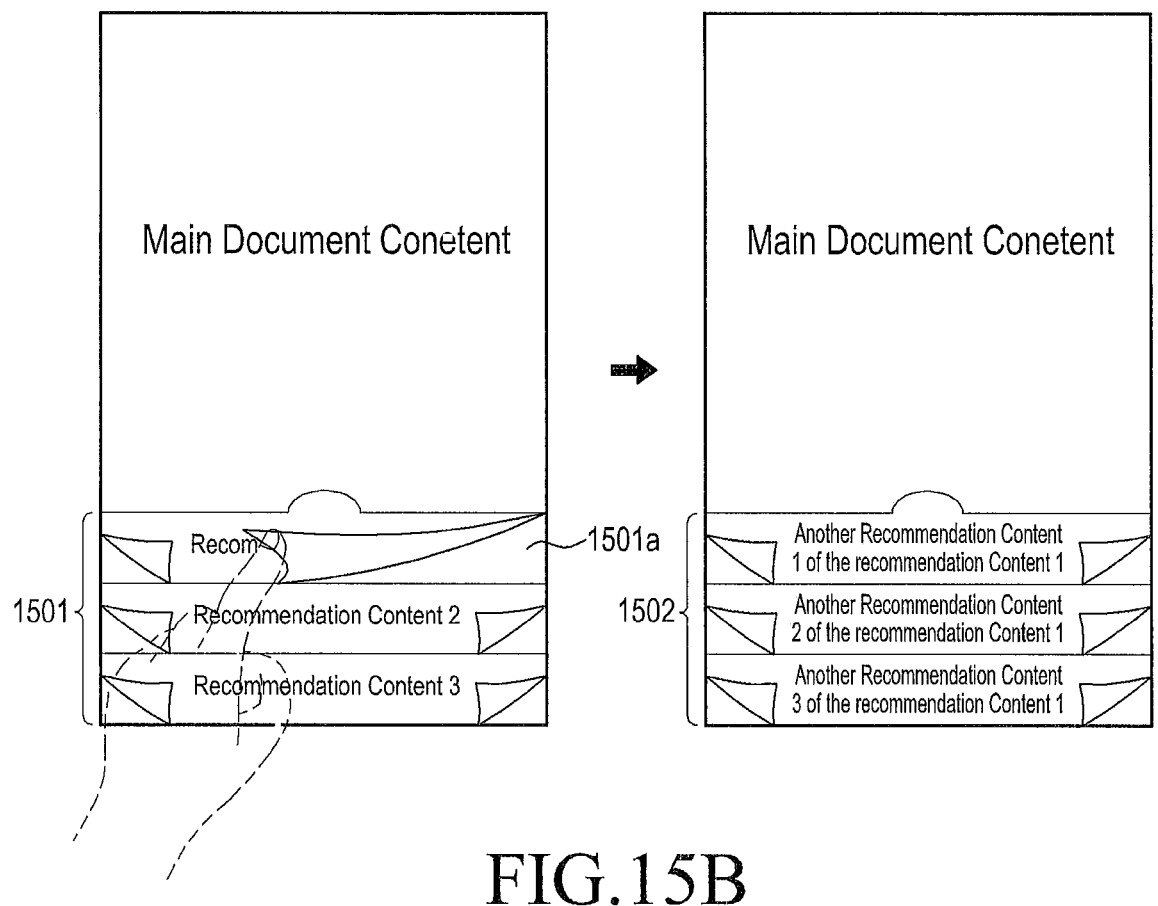
Figure 15C:
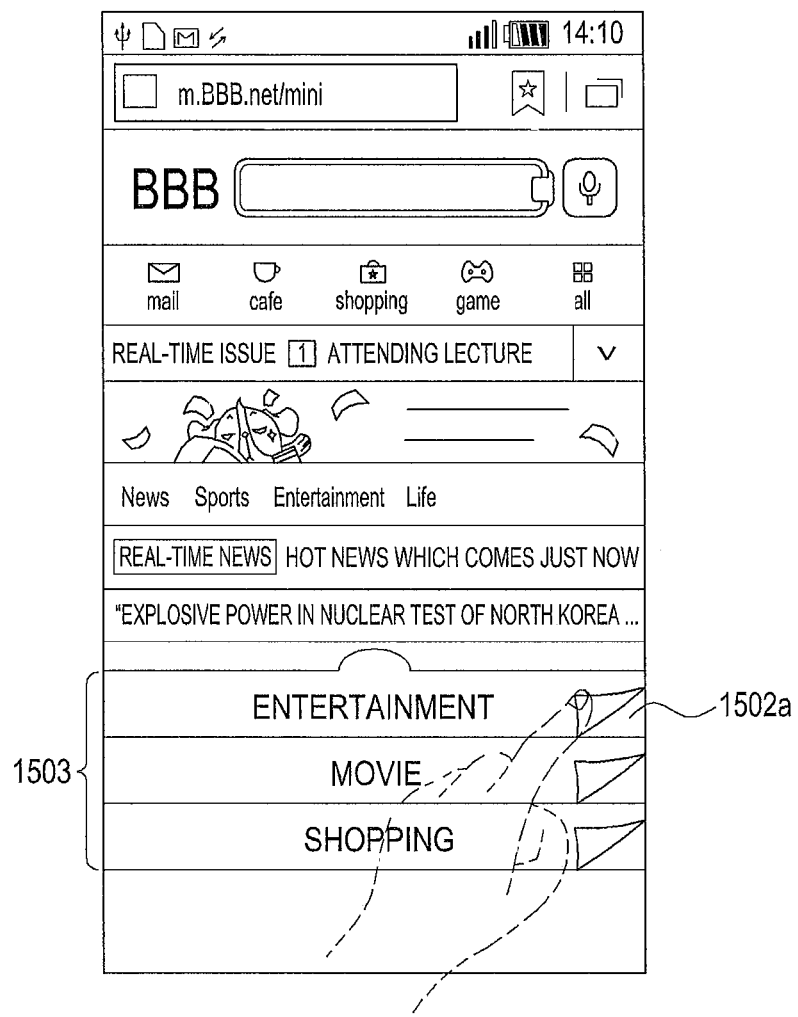

FIGS. 15A, 15B and 15C are views illustrating recommended items provided in a paging form in the electronic document of the electronic device according to certain embodiments.

One or more recommended items are provided in various forms according to certain embodiments, and the one or more recommended item can be provided in the paging form 1501 in a predetermined region of the specific page in FIG. 15A. When a specific item 1501a of the recommended items 1051 are selected through a paging operation as shown in FIG. 15B, the controller 110 moves to and displays a page corresponding to the selected and recommended specific item 1051a, and controls one or more recommended items 1502 which are recommended again in a predetermined region of the moved page to be displayed.

Figure 15D:
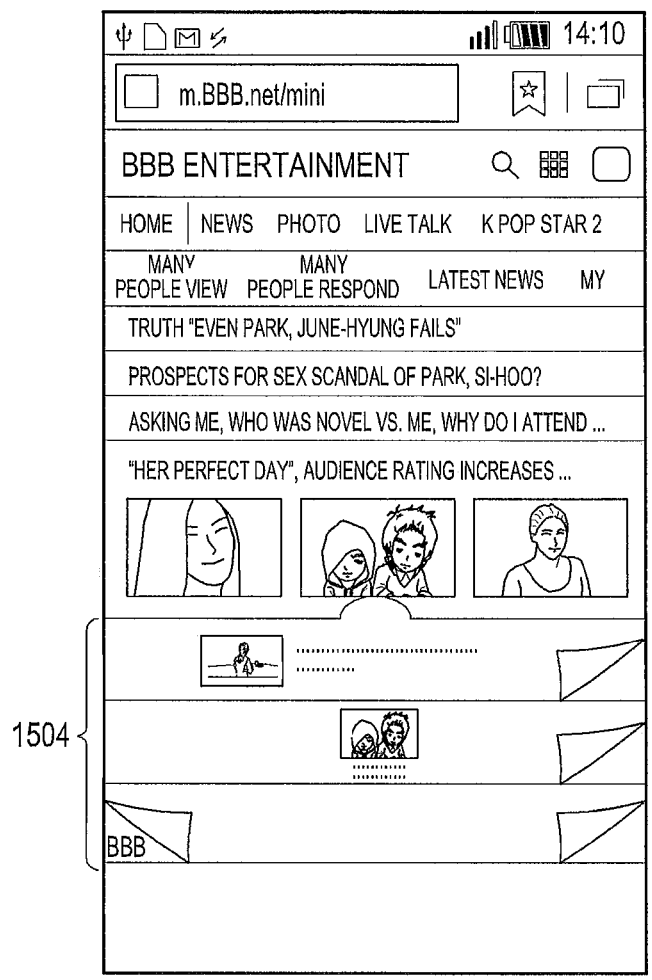

In FIG. 15C, in a case where one or more recommended items 1503 are provided in the paging form, based on the user information table of the BBB site in a predetermined region of a specific page of the BBB site, when an "entertainment" recommended item 1503a is selected through a paging operation from the one or more recommended items 1503, the controller 110 moves to and displays an entertainment page corresponding to the "entertainment" recommended item 1503a as shown in FIG. 15D, and controls one or more recommended items 1504 to be displayed in a predetermined region of the entertainment.

FIGS. 16A, 16B, 16C and 16D are views illustrating operation of showing the recommended items via a specified gesture in the electronic document of the electronic device according to certain embodiments.

Figure 16A:
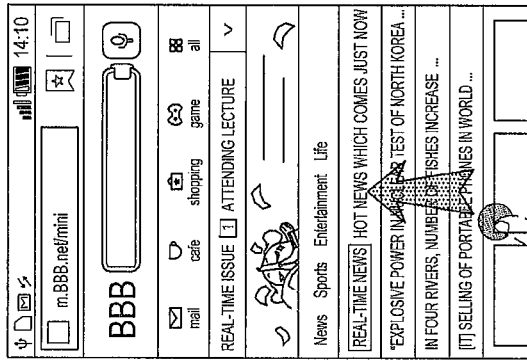
FIGS. 16A, 16B, 16C and 16D illustrate an operation of showing the recommended items via a specified gesture in the electronic document of the electronic device according to certain embodiments.
Figure 16B:
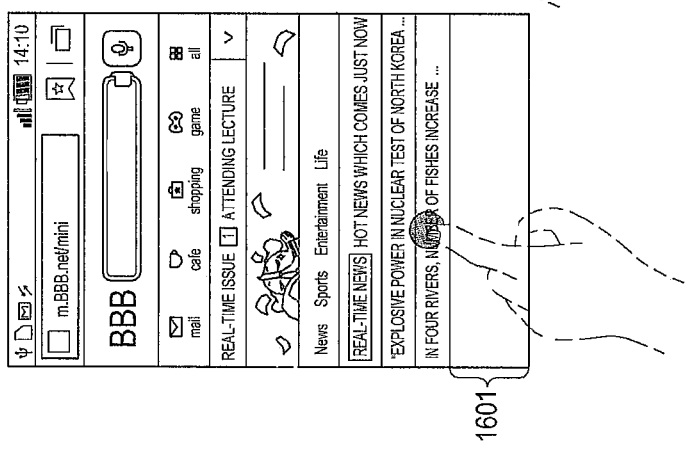

When a drag is generated at an upper portion of the display unit as shown in FIG. 16B after a touch is generated at a lower portion of the display unit in the specific page of the BBB site as shown in FIG. 16A, a region 1601 including one or more recommended items is displayed as shown in FIG. 16B.

Figure 16C:
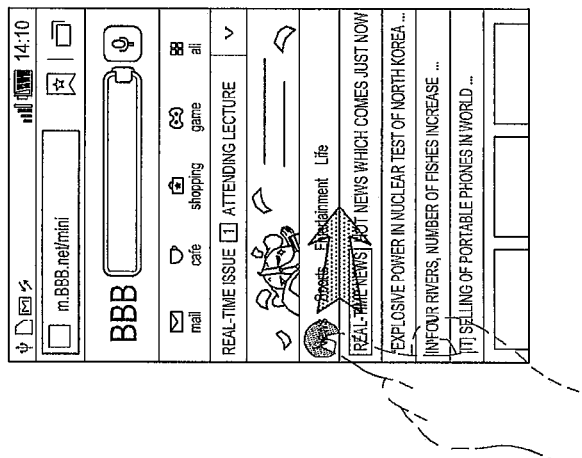
Figure 16D:
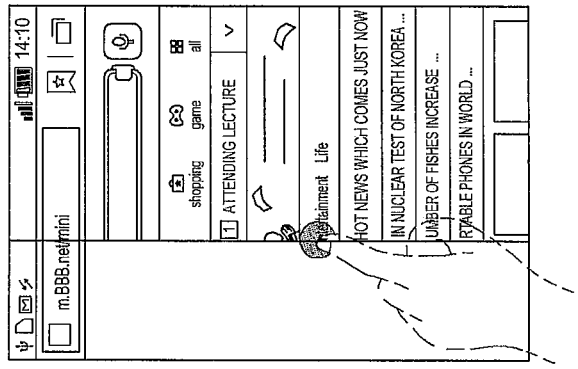

When a drag is generated at a right portion of the display unit as shown in FIG. 16D after a touch is generated at a left portion of the display unit in the specific page of the BBB site as shown in FIG. 16C, a region 1602 including one or more recommended items is displayed as shown in FIG. 16D.

A region in which the one or more recommended items are displayed as a user customized electronic document map is expressed in a specific region of the existing electronic document. The region in which the recommended items are displayed can be displayed on the electronic document in the overlaid form, and can be expressed in a separate window form separately from the electronic document. Further, when the region is overlaid, the electronic document can be transparently shown through the overlaid window. In FIGS. 16A, 16B, 16C and 16D, it is shown as an example that one or more recommended items are overlaid on the electronic document through a specific gesture such as a drag operation. However, the one or more recommended items can be directly shown through the provision of a button. As described above, a method of expressing one or more recommended items can be provided in various methods as unlimited examples.

Figure 17:
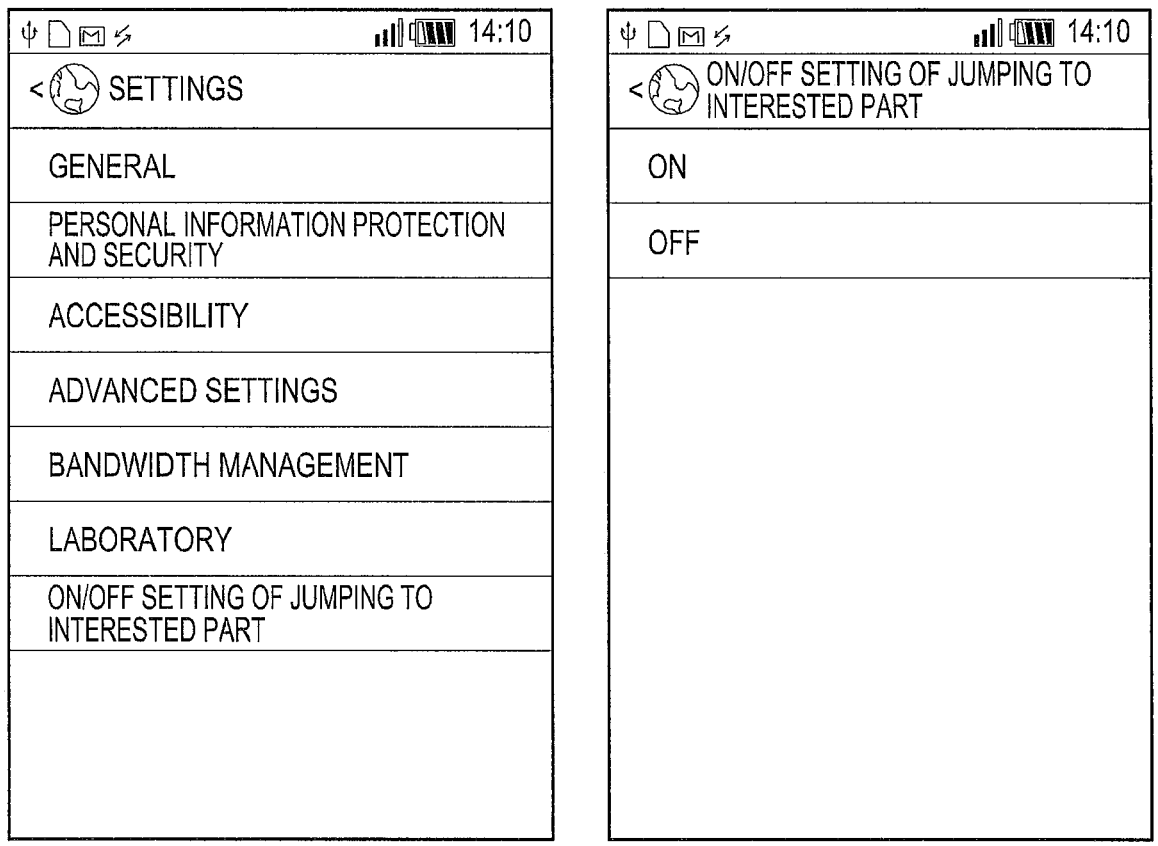
FIG. 17 illustrates an operation of setting a display of the recommended items in an environment setting menu of the electronic device according to certain embodiments.

FIG. 17 is a view illustrating an operation of setting a display of the recommended items in an environment setting menu of the electronic device according to certain embodiments.

A display of one or more recommended items according to certain embodiments is set in a separate setting page such as an environment setting menu.

Figure 18A:
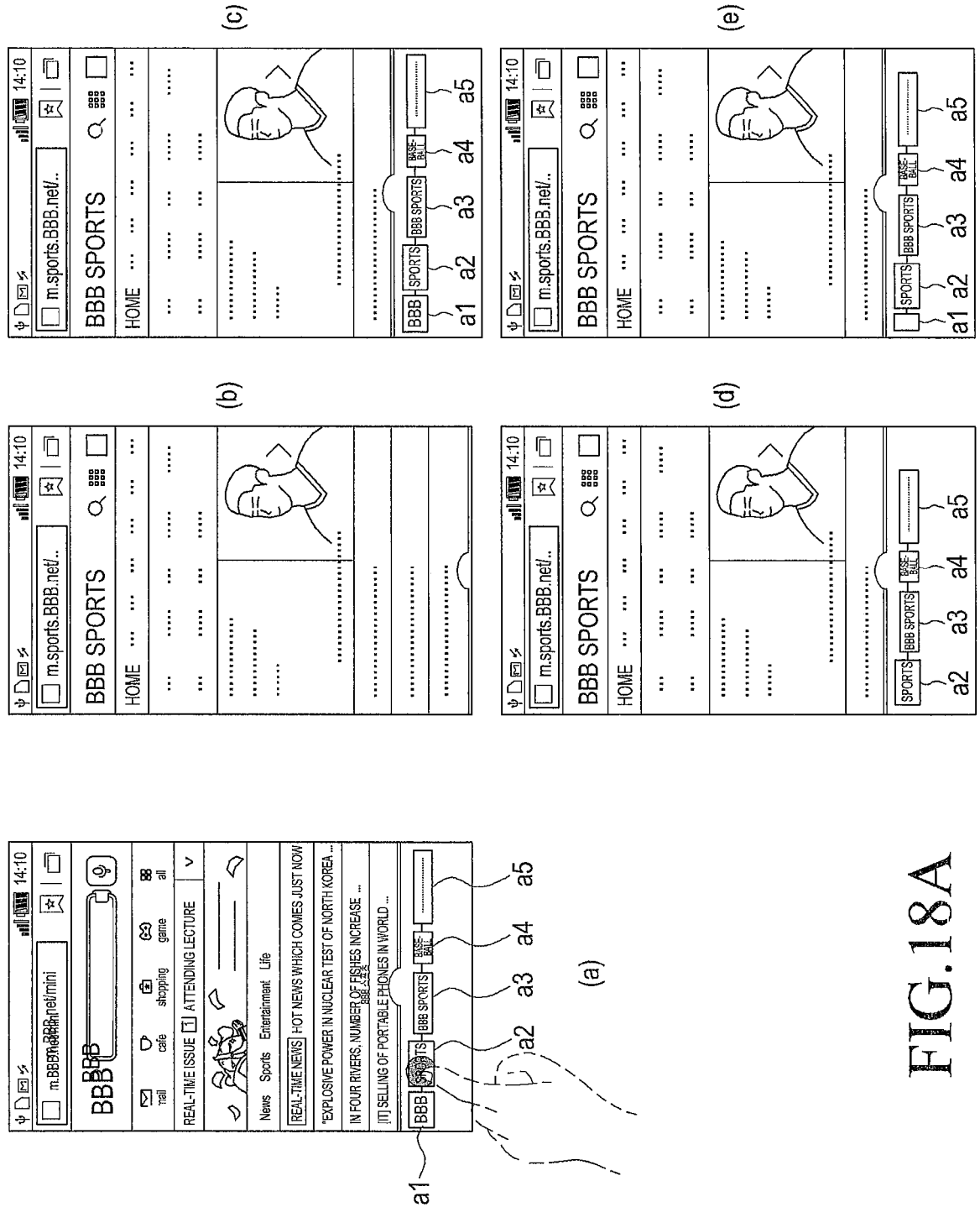
FIGS. 18A and 18B illustrate an operation of displaying remaining recommended items in the electronic document of the electronic device according to certain embodiments, after a user selects a specific recommended item.
Figure 18B:
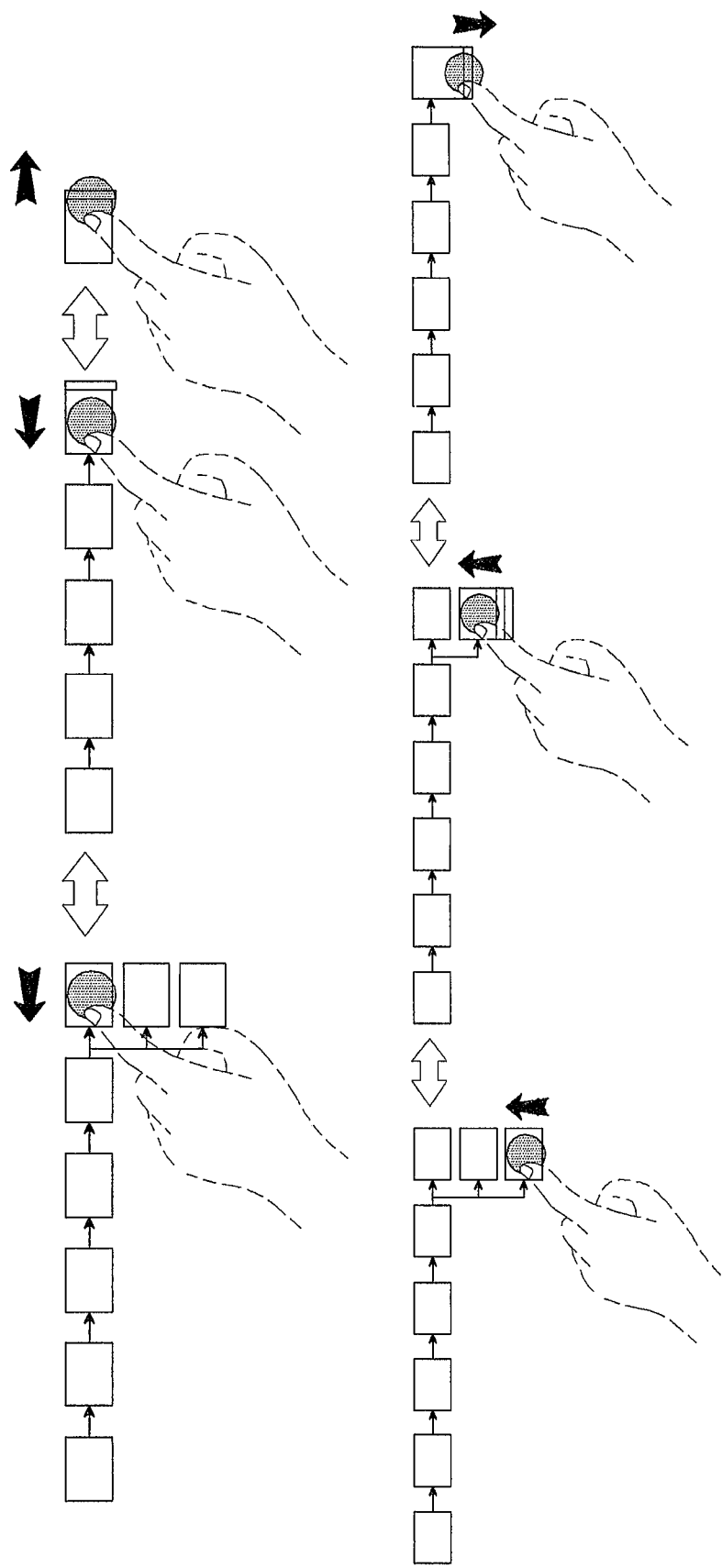

FIGS. 18A and 18B are views illustrating an operation of displaying remaining recommended items in the electronic document of the electronic device according to certain embodiments, after a user selects a specific recommended item.

In FIG. 18A, an operation is shown of processing the one or more recommended items after a specific item is selected from the one or more recommended items displayed on the electronic document.

In FIG. 18A (a), when a "sports" item a2 is selected from one or more recommended items a1, a2, a3, a4 and a5, the controller 110 moves to and displays a sports page of a BBB site as shown by (b) in FIG. 18A before controlling the at least one item not to be displayed. The controller 110 moves to and displays the sports page of the BBB site as shown by (c) in FIG. 18A before controlling the one or more items a1, a2, a3, a4 and a5. The controller 110 moves to and displays the sports page of the BBB site as shown by (d) in FIG. 18A, before controlling the one or more items a2, a3, a4 and a5 excluding item a1 corresponding to a previous page. The controller 110 moves to and displays the sports page of the BBB site as shown by (e) in FIG. 18A, before controlling a recommended item a1 corresponding to a previous page to be displayed by distinguishing the one or more items a2, a3, a4 and a5.

As described above, when the controller moves to an interest page or region in the electronic document by using one or more recommended items displayed as a user customized electronic document map, the one or more recommended items can be changed in various shapes for user's convenience. The one or more recommended items maintain an existing shape, and can be not displayed in order not to overlay the electronic document. Further, it is possible to display which item of one or more recommended items is matched with the electronic document, while the recommended item maintains the existing shape. The recommended items corresponding to previous pages can be displayed in various methods. By emphasizing only the recommended item corresponding to the current page and displaying the other recommended items to be squashed or small, the recommended item corresponding to the current page is only emphasized.

FIG. 18B is a view illustrating an operation of allowing a user to adjust one or more recommended items in the tree form and to selectively view the recommended items when the one or more recommended items are displayed in the tree form.

As shown in FIG. 18B, the one or more recommended items in the tree form have a relation of the child and parent, and the user can adjust the recommended items in various manners of folding or rolling a part of the recommended items to a desired extent.

As described above, the one or more recommended items are provided in various forms as well as the tree form, and similarly include a function of adjusting an area which the user desires to see.

FIGS. 19A, 19B, 19C and 19D is a view illustrating an operation of selecting a recommended item with a voice in the electronic document of the electronic device according to certain embodiments.

FIGS. 19A, 19B, 19C and 19D, it is shown as an embodiment that the one or more recommended items displayed on the electronic document can be selected through a user voice or a keypad.

Figure 19A:
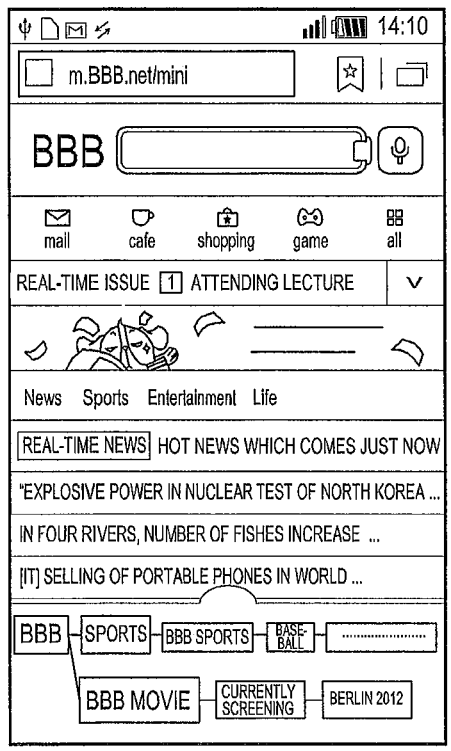
FIGS. 19A, 19B, 19C and 19D illustrate an operation of selecting a recommended item with a voice in the electronic document of the electronic device according to certain embodiments.
Figure 19B:
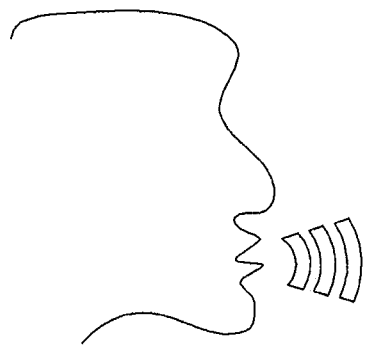
Figure 19C:
Figure 19D:
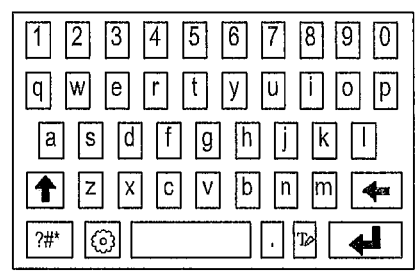

As shown in FIG. 19A, numbers can be assigned to the one or more recommended items displayed in a predetermined region of a specific page of the BBB site. In this case, it is possible to move to a page corresponding to a recommended item which corresponds to the number input through the user's voice, as shown in FIG. 19B. Otherwise, it is possible to move a page corresponding to a recommended item which corresponds to the number input through an input of a separate hard keypad as shown by in FIG. 19C or an input of a soft keypad displayed on a display unit as shown in FIG. 19D.

Figure 20:
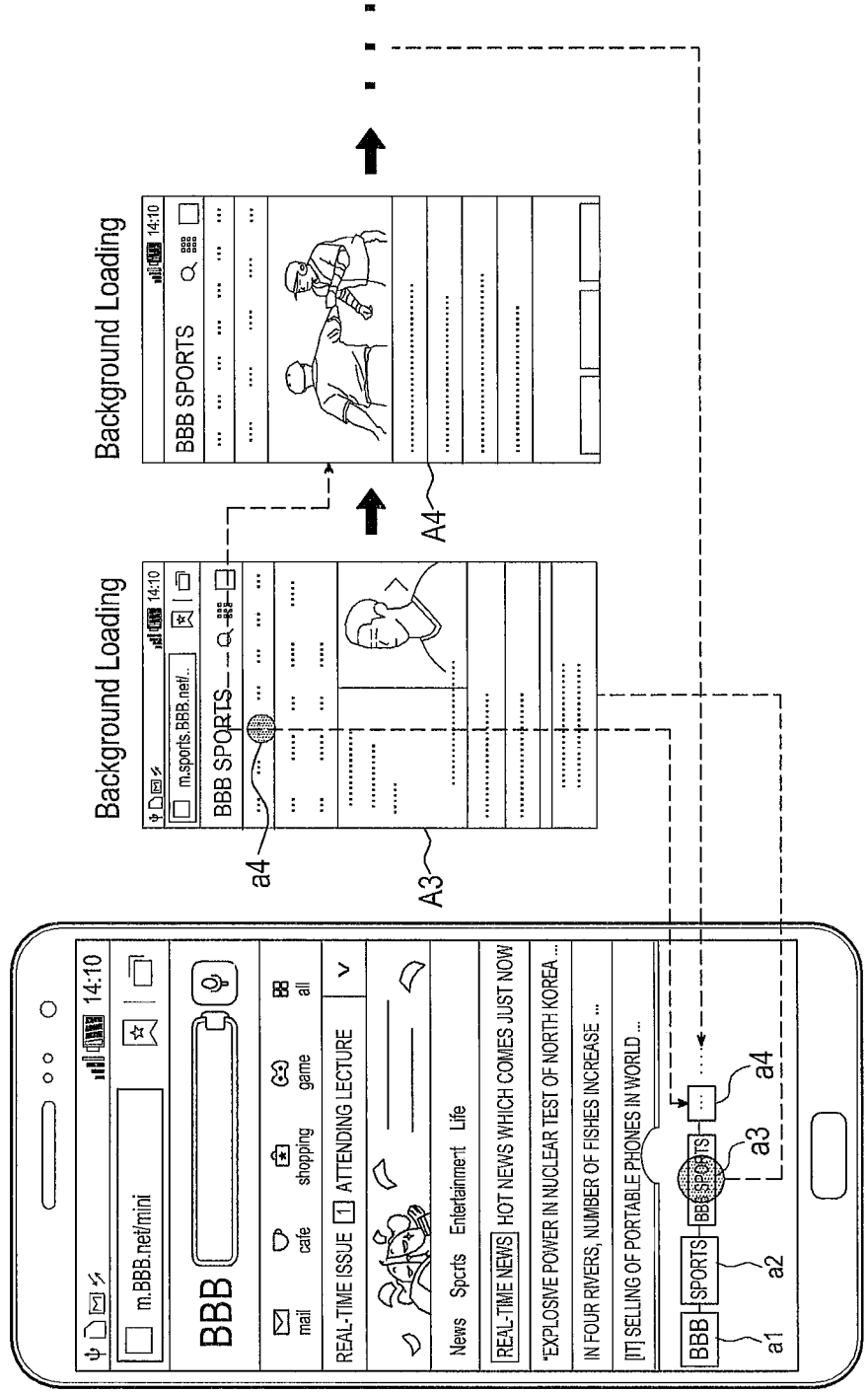
FIG. 20 illustrates recommended items, which are changed as objects are changed in real-time, in the electronic document of the electronic device according to certain embodiments.

FIG. 20 is a view illustrating a recommended item, which is changed as an object is changed in real-time, in the electronic document of the electronic device according to certain embodiments.

FIG. 20 is a view illustrating one or more recommended items which are changed as the object is changed in real-time in the electronic document of the electronic device according to certain embodiments.

When one or more recommended items a1, a2 and a3 are displayed in a predetermined region of a specific page of the BBB site as shown in FIG. 20, the controller 110 previously loads a BBB sports page corresponding to a "BBB sports" item, and adds and displays the detected and interest item a4 to one or more recommended items a1, a2 and a3 displayed in a predetermined region of a specific page of the BBB if the user interest item a4 is present in the previously loaded BBB sports page, based on the user information table of the BBB site.

Figure 21:
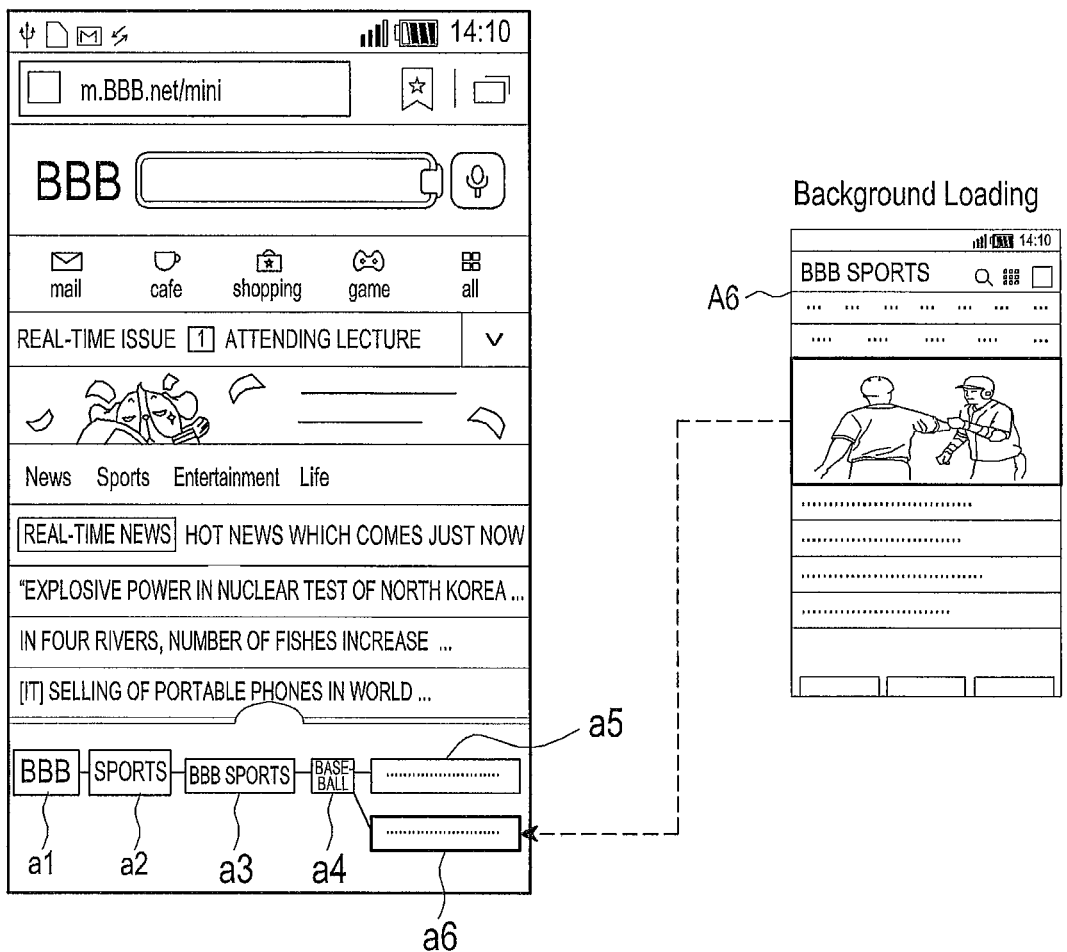
FIG. 21 illustrates an operation of additionally displaying a recommended item corresponding to a new interest object in the electronic document of the electronic device according to certain embodiments.

FIG. 21 is a view illustrating an operation of additionally displaying a recommended item corresponding to a new interest object in the electronic document of the electronic device according to certain embodiments.

In FIG. 21, an operation is shown of adding the newly detected interest item to the one or more recommended items when it is detected that an item is frequently selected by a user or is new even though the item is not present in a user information table of an electronic document.

As shown in FIG. 21, when one or more recommended items a1, a2, a3, a4 and a5 are displayed in a predetermined region of a specific page of the BBB site, the controller 110 previously loads a baseball page corresponding to the "baseball" item. As a result, when it is detected that there is a user interest item a6 or a new and hot interest item a6, the detected and interest item a6 is added to the one or more recommended items a1, a2, a3, a4 and a5 displayed in a predetermined region of a specific page of the BBB site.

As shown in FIGS. 20 and 21, in a case where a predictable history, for example, a user information table is not present, if there is a representative profile for a user interest field, the representative profile is continuously loaded with respect to the current electronic document and the other electronic documents connected to the current electronic document and then analyzed, so as to make it possible to recommend an item.

The apparatus and method for processing information of an electronic document according to certain embodiments can be implemented as codes which are stored in a recording medium and read by a computer. The computer-readable recording medium includes all the types of recording devices in which data readable by a computer system are stored. As for such a recording medium, for example, a ROM, a RAM, an optical disc, a magnetic tape, a floppy disc, a hard disc, or a non-volatile memory can be used, and a medium implemented in a type of carrier wave (for example, transmission through the Internet) can also be included in such a recording medium. In addition, the computer-readable recording medium can be stored with codes which are distributed in computer systems connected by a network such that the codes can be read and executed by a computer in a distributed method.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
  a memory configured to store a plurality of user information tables corresponding to a plurality of electronic documents, respectively;
  a display; and
  a processor configured to:
    when a first address for displaying a first electronic document is input and a user information table of the first electronic document does not exist in the plurality of user information tables stored in the memory, display the first electronic document and generate the user information table of the first electronic document for interest information related to the first electronic document based on a first object selected by a user input among at least one object included in the first electronic document;
    when the first address for displaying the first electronic document is input and the user information table of the first electronic document exists in the plurality of user information tables stored in the memory, display, the first electronic document and at least one recommended item indicating interest information related to the first electronic document based on the user information table of the first electronic document in at least part of the first electronic document;
    when a second address different from the first address for displaying a second electronic document is input and a user information table of the second electronic document does not exist in the plurality of user information tables stored in the memory, display the second electronic document and generate the user information table of the second electronic document for interest information related to the second electronic document based on a second object selected by a user input among at least one object included in the second electronic document;
    when the second address for displaying the second electronic document is input and the user information table of the second electronic document exists in the plurality of user information tables stored in the memory, display the second electronic document and at least one recommended item indicating interest information related to the second electronic document based on the user information table of the second electronic document in at least part of the second electronic document; and
    when a third electronic document is displayed, and wherein the third electronic document is different than the first electronic document, provide, on the third electronic document displayed in the display, the at least one recommended item based on the user information table of the first electronic document, by:
      retrieving object information, for each object of a plurality of objects of the third electronic document, through an analysis of a third electronic document markup language,
      extracting user information stored in the user information table of the first electronic document that are related to the object information retrieved from the third electronic document, and
      providing the at least one recommended item based on the extracted user information from the first electronic document, when user information of the third electronic document is not present.

2. The electronic device of claim 1, wherein functions corresponding to the at least one recommended item indicating interest information related to the first electronic document includes at least one of a movement to a previous page, a movement to a recommendation page, a recommended action, a movement to a page to be recommended in the recommendation page, or an action to be recommended in the recommendation page.

3. The electronic device of claim 1, wherein the processor is configured to variably change and display the at least one recommended item based on the user information table of the first electronic document.

4. The electronic device of claim 1, wherein the processor is configured to provide the at least one recommended item based on the user information table of the first electronic document as a menu to move to an interest region in a page of the first electronic document.

5. The electronic device of claim 1, wherein the processor is configured to provide the at least one recommended item based on the user information table of the first electronic document as a menu to move to at least one of an interest page of the first electronic document or to an interest page of a third electronic document.

6. The electronic device of claim 1, wherein the processor is configured to:
detect an interest region in a page of the first electronic document based on the user information table of the first electronic document when the first electronic document is displayed; and
move to the interest region to be displayed in the display when the interest region does not display in the display.

7. The electronic device of claim 1, wherein the processor is configured to change a form to one of a plurality of forms.

8. The electronic device of claim 1, wherein the processor is configured to determine whether the at least one recommended item indicating interest information related to the first electronic document is displayed based on a specific gesture.

9. The electronic device of claim 1, wherein the processor is configured to:
change the at least one recommended item indicating interest information related to the first electronic document when the first object is changed in the first electronic document; and
provide, on the first electronic document, a newly obtained object as the at least one recommended item indicating interest information related to the first electronic document when the newly obtained object is obtained in the first electronic document.

10. A method of processing information of an electronic device, the method comprising:
when a first address for displaying a first electronic document is input and a user information table of the first electronic document does not exist in the plurality of user information tables stored in the memory, displaying the first electronic document and generating the user information table of the first electronic document for interest information related to the first electronic document based on a first object selected by a user input among at least one object included in the first electronic document;
when the first address for displaying the first electronic document is input and the user information table of the first electronic document exists in the plurality of user information tables stored in the memory, displaying, the first electronic document and at least one recommended item indicating interest information related to the first electronic document based on the user information table of the first electronic document in at least part of the first electronic document;
when a second address different from the first address for displaying a second electronic document is input and a user information table of the second electronic document does not exist in the plurality of user information tables stored in the memory, displaying the second electronic document and generating the user information table of the second electronic document for interest information related to the second electronic document based on a second object selected by a user input among at least one object included in the second electronic document;
when the second address for displaying the second electronic document is input and the user information table of the second electronic document exists in the plurality of user information tables stored in the memory, displaying the second electronic document and at least one recommended item indicating interest information related to the second electronic document based on the user information table of the second electronic document in at least part of the second electronic document; and
when a third electronic document is displayed, and wherein the third electronic document is different than the first electronic document, providing, on the third electronic document displayed in the display, the at least one recommended item based on the user information table of the first electronic document, by:
retrieving object information, for each object of a plurality of objects of the third electronic document, through an analysis of a third electronic document markup language,
extracting user information stored in the user information table of the first electronic document that are related to the object information retrieved from the third electronic document, and
providing the at least one recommended item based on the extracted user information from the first electronic document, when user information of the third electronic document is not present.

11. The method of claim 10, further comprising:
detecting an interest region from a page of the first electronic document based on the user information table of the first electronic document, when the first electronic document is displayed; and
moving to the interest region to be displayed in the display, when the interest region does not display in the display.

12. The method of claim 10, further comprising:
changing the at least one recommended item indicating interest information related to the first electronic document when the first object is changed in the first electronic document; and
displaying a newly obtained object as the at least one recommended item indicating interest information related to the first electronic document, when the newly obtained object is obtained in the first electronic document.

13. A non-transitory storage medium containing computer readable instructions which, when executed by a processor, are configured to cause a display operably connected to the processor to:
when a first address for displaying a first electronic document is input and a user information table of the first electronic document does not exist in the plurality of user information tables stored in the memory, display the first electronic document and generate the user information table of the first electronic document for interest information related to the first electronic document based on a first object selected by a user input among at least one object included in the first electronic document;

when the first address for displaying the first electronic document is input and the user information table of the first electronic document exists in the plurality of user information tables stored in the memory, display, the first electronic document and at least one recommended item indicating interest information related to the first electronic document based on the user information table of the first electronic document in at least part of the first electronic document;

when a second address different from the first address for displaying a second electronic document is input and a user information table of the second electronic document does not exist in the plurality of user information tables stored in the memory, display the second electronic document and generate the user information table of the second electronic document for interest information related to the second electronic document based on a second object selected by a user input among at least one object included in the second electronic document;

when the second address for displaying the second electronic document is input and the user information table of the second electronic document exists in the plurality of user information tables stored in the memory, display the second electronic document and at least one recommended item indicating interest information related to the second electronic document based on the user information table of the second electronic document in at least part of the second electronic document; and when a third electronic document is displayed, and wherein the third electronic document is different than the first electronic document, provide, on the third electronic document displayed in the display, the at least one recommended item based on the user information table of the first electronic document, by:

retrieving object information, for each object of a plurality of objects of the third electronic document, through an analysis of a third electronic document markup language, extracting user information stored in the user information table of the first electronic document that are related to the object information retrieved from the third electronic document, and providing the at least one recommended item based on the extracted user information from the first electronic document, when user information of the third electronic document is not present.

* * * * *